United States Patent
Shinohara et al.

(10) Patent No.: US 7,055,416 B2
(45) Date of Patent: Jun. 6, 2006

(54) TOOL HOLDER AND METHOD OF MACHINING WORK USING THIS TOOL HOLDER

(75) Inventors: Hiroshi Shinohara, Tokorozawa (JP); Yuji Miyazaki, Tokorozawa (JP); Reiner Ernst, Esslingen (DE)

(73) Assignee: Citizen Watch Co., Ltd., Nishitokyo (JP)

( * ) Notice: Subject to any disclaimer, the term of this patent is extended or adjusted under 35 U.S.C. 154(b) by 0 days.

(21) Appl. No.: 10/220,780

(22) PCT Filed: Mar. 10, 2000

(86) PCT No.: PCT/JP00/01467

§ 371 (c)(1),
(2), (4) Date: Sep. 24, 2002

(87) PCT Pub. No.: WO01/66290

PCT Pub. Date: Sep. 13, 2001

(65) Prior Publication Data

US 2005/0217441 A1   Oct. 6, 2005

(51) Int. Cl.
  B23B 29/24  (2006.01)
  B23B 29/26  (2006.01)

(52) U.S. Cl. .............................. 82/1.11; 82/121; 82/159
(58) Field of Classification Search .................. 82/1.11, 82/121, 129, 158, 159, 161
See application file for complete search history.

(56) References Cited

U.S. PATENT DOCUMENTS 2,630,732 A * 3/1953 Piazze ............................ 82/13
4,510,829 A * 4/1985 Kintzel et al. ................. 82/158
4,611,383 A * 9/1986 Sonnek .......................... 82/158
6,244,780 B1 * 6/2001 Hansson .................... 403/374.3

FOREIGN PATENT DOCUMENTS

| DE | 24 15 004 | 10/1975 |
|---|---|---|
| DE | 31 30 229 | 2/1983 |
| DE | 32 37 587 | 4/1984 |
| JP | 61-78508 | 5/1986 |
| JP | 2-190202 | 7/1990 |
| JP | 3-1704 | 1/1991 |
| JP | 4-51308 | 4/1992 |
| JP | 5-12013 | 2/1993 |
| JP | 6-703 | 1/1994 |
| JP | 7-185901 | 7/1995 |
| JP | 8-126901 | 5/1996 |
| JP | 2878690 | 1/1999 |

* cited by examiner

Primary Examiner—Willmon Fridie, Jr.
(74) Attorney, Agent, or Firm—Manabu Kanesaka

(57) ABSTRACT

There is provided a tool holder capable of attaching a plurality of tools to one tool holder, and easily adjusting these tools in a positional relation suitable for work machining. The tool holder comprises a holder body 201 attached to a tool rest 160, a plurality of surfaces 202 and 203 formed around the holder body 201, holders 210 and 220 attached to the surfaces 202 and 203 and having tools for machining the work attached thereto, toothed portions 208 and 209 of tooth-shaped rows formed in a predetermined direction on the surfaces 202 and 203, engaging portions 211 and 221 formed on the surfaces of the holders attached to the surfaces 202 and 203, and engaged with the toothed portions to position the holders in predetermined positions of the surfaces 202 and 203, and attaching means 240 and 250 for attaching the holders to the holder body in engaging states between the toothed portions and the engaging portions.

11 Claims, 18 Drawing Sheets

TOOL HOLDER AND METHOD OF MACHINING WORK USING THIS TOOL HOLDER

TECHNICAL FIELD

The present invention relates to a tool holder for attaching tools to a tool rest of a machine tool, and a method of machining a work by the use of this tool holder.

BACKGROUND ART

To machine a work by a machine tool, a plurality of tools are attached to a turret type or comb-tooth type tool rest, and assigning a tool suitable for machining the work to a machining position. Then, the machining is carried out by rotating a spindle or the tool gripping the work or the like, and pressing the tool to the work.

Especially, in a numerical control (NC) machine tool for automatically carrying out a series of machining steps, the tool is attached through a tool holder to the tool rest. If necessary, the tool can be easily exchanged together with the tool holder.

One of such tool holders is disclosed in, for example, Japanese Patent No. 2878690, which can attach a plurality of tools to a holder body.

FIGS. 16(a) to 16(c) are explanatory views each showing a work machining method by an NC lathe described in Japanese Patent No. 2878690 mentioned above.

The NC lathe described therein includes first and second spindle stocks 320 and 330 arranged oppositely to each other, and a tool rest 360 arranged between the two spindle stocks 320 and 330. On the first spindle stock 320, a first spindle 321 is rotatably supported. On the second spindle stock 330, a second spindle 331 is rotatably supported on the same axis as that of the first spindle 321. The tool rest 360 can be freely moved in a direction of a Z1 axis parallel to the axis of the first spindle 321, and in a direction of an X1 axis orthogonal to the Z1 axis. Further, the second spindle stock 330 can be freely moved in a direction of a Z2 axis parallel to the Z1 axis.

On a turret plate 361 of the tool rest 360, drills T1' and T3' are attached back to back to the same tool attaching position (station) 362. The first spindle 321 grips a work W1, and the second spindle 331 grips a work W2.

To machine the work W1 gripped by the first spindle 321 with the drill T1', as shown in FIG. 16(a), the tool rest 360 is moved in the direction of the X1 axis so as to match an axis of the drill T1' with the axis of the spindle 321. Then, as shown in FIG. 16(b), the tool rest 360 is moved in a direction of a –Z1 axis to feed the drill T1' to the work W1. To machine the work W2 gripped by the second spindle 331 with the drill T3', the tool rest 360 is moved in a direction of a +Z1 axis while a position of the X1 axis direction of the tool rest 360 is maintained.

In the NC lathe shown in FIGS. 16(a) to 16(c), the second spindle stock 330 is movable in a direction of a Z2 axis. Thus, instead of moving the tool rest 360 in the direction of the +Z1 axis in machining of the work 2, as shown in FIG. 16(c), the second spindle stock 330 may be moved in a direction of a –Z2 axis to machine the work W2 by the drill T3'.

In addition, in the NC lathe described in the Japanese Patent referenced herein, the movement of the second spindle stock 330 can be superposed on the movement of the tool rest 360 in the direction of the Z1 axis. Thus, drilling of the work W2 can be carried out by the drill T3' while the work W1 is drilled by the drill T1'.

However, a drawback is inherent in the NC lathe shown in FIGS. 16(a) to 16(c), i.e., impossibility of off-line setting-up of tools T1 and T2 because the tools T1' and T2' are directly attached to the turret plate 361.

To prevent such inconvenience, a tool holder has been well-known, for example one similar to that shown in FIG. 17, which can attach two different tools.

As shown in FIG. 17, a tool holder 400 includes a holder body 401 attached to the turret plate 361 of the tool rest 360 of the NC lathe, a first tool attaching portion 410 for attaching the first tool T1' such as a drill, and a second tool attaching portion 420 for attaching the second tool T2' such as a turning tool, back to back with the first tool T1'.

The first tool T1' is attached to the first tool attaching portion 410 by a bolt 440, and the second tool T2' to the second tool attaching portion 420 by a bolt 450.

Each of FIGS. 18(a) and 18(b) shows a method of machining the works W1 and W2 by the tool holder 400, and the tools T1' and T2' attached to the tool holder 400. In FIGS. 18(a) and 18(b), portions similar to those of the NC lathe shown in FIGS. 16(a) to 16(c) are denoted by similar reference numerals, and detailed description thereof will be omitted.

In the machining example of each of FIGS. 18(a) and 18(b), the tool T1' is positioned on an axis of the work W1 by the movement of the tool rest 360 in the directions of the X1 and Z1 axis. Then, by feeding the tool rest 360 in the direction of the –Z1 axis, the work W1 is machined by the tool T1'.

After the machining of the work W1 by the tool T1', the tool rest 360 is moved in the directions of the +X1 and +Z1 axis, and a edge of the tool T2' as a turning tool is pressed to an outer peripheral surface of the work W2 of the second spindle 331. Then, by moving the tool reset 360 in the direction of the Z1 axis or the second spindle stock 330 in the direction of the –Z2 axis, the tool T2' is fed to the work W2, and machining is carried out.

FIG. 19 shows another embodiment of the tool holder shown in FIG. 17.

A tool holder 450 of FIG. 19 includes a tool body 451 attached to a peripheral surface of the turret plate 361 of the tool rest 360, and two tool attaching portions 452 and 453 formed from the tool body 451 in a diameter direction of the turret plate.

In this example, tools T4' and T5' as turning tools are attached to the tool attaching portions 452 and 453 with edges thereof shifted in position from each other.

Sizes of the tool attaching portions 452 and 453 are predetermined according to shapes of machined portions W1a and W2a of the works W1 and W2 such that edge positions of the tools T1 and T2 can be shifted by a predetermined amount (H in the example of FIG. 19).

In a machine tool shown in FIG. 19, a first spindle stock 320' can be freely moved in a direction of a Z0 axis, and a second spindle stock 330 in a direction of a Z2 axis. Also, the tool rest 360 can be freely moved in a direction of an X1 axis.

The first and second spindle stocks 320' and 330 are moved from both sides of the tool rest 360 to the tool rest 360 side, and the tool rest 360 is moved in the direction of the X1 axis. Accordingly, the works W1 and W2 are machined by the tools T1 and T2.

Use of the tool holder 450 capable of attaching the tools T1' and T2' with their knife point positions shifted from each other according to the shapes of the machined portions W1a and W2a enables the works W1 and W2 to be simultaneously machined even in the conventional NC lathe.

Thus, it is well known that a plurality of machining operations carried out for a plurality of works without any adjustment of the tool rest by attaching two or more tools to the tool holder, and execution of such machining on the tool rest by the tool holder having a pair of tools contribute to shortening of machining time, and a lower price of the machine tool.

However, problems have been inherent in the above-described tool holder. Namely, because of the integral formation of the tool attaching portions for attaching the tools with the holder body, in addition to the combination of the drills and the turning tools shown in FIG. 17, a tool holder must be prepared for each combination of tools such as a combination of drills, or a combination of turning tools. Also, in the tool holder 450 shown in FIG. 19, a number of tool holders 450 having predetermined sizes of tool attaching portions 452 and 453 must be prepared according to the shapes of the machined portions W1a and W2a of the works W1 and W2.

In addition, in recent years, there has been an increase in demand for a compact and low-priced machine tool capable of machining a work more efficiently and at lower costs.

Furthermore, in a production system and production facilities including machine tools, shortening of setting-up time including changing of tools for work machining, a reduction of types of tools including a tool holder, a reduction of storage space thereby needed, and a reduction of running costs including an increase of storage efficiency or the like are essential. There has also been an increase in demand for these matters.

The present invention has been developed to solve the foregoing problems and meet the demands. Objects of the invention are to provide a tool holder capable of having not only similar but also different types of tools easily attached thereto detachably, and easily adjusting the tools attached to the tool holder in a positional relation suitable for work machining, and a work machining method capable of efficiency machining a work by using this tool holder. More particularly, the invention provides a tool holder capable of carrying out machining by a compact and low-price machine tool when a plurality of works are simultaneously machined by a plurality of tools, and a work machining method using this tool holder.

DISCLOSURE OF THE INVENTION

The present invention provides a tool holder, for attaching a tool, attached to a tool rest of a machine tool having the tool rest provided with the tool for machining a work, comprising a holder body attached to the tool rest, a plurality of tool attaching surfaces formed around the holder body, a holder which is attached to the tool attaching surface and to which the tool for machining the work is attached, a toothed portion of a tooth-shaped row formed in a predetermined direction on the tool attaching surface, an engaging portion formed on the holder surface attached to the tool attaching surface and engaged with the toothed portion to position the holder in a predetermined position of the tool attaching surface, and attaching means for attaching the holder to the holder body in an engaging state where the toothed portion is engaged with the engaging portion.

According to this configuration, a positional relation among a plurality of tools can be optionally set by removing the holder from the holder body, and changing an engaging position between the engaging portion of the holder and the toothed portion of the holder body.

Moreover, a edge of the tool can be easily ground while the tool is attached to the holder, and accuracy of a edge position of the tool with respect to the holder or the holder body can be secured.

Preferably, the attaching means comprises an engaging groove formed in the tool attaching surface, an engaging member slidably provided in the holder and having one end engaged with the engaging groove and the other end connected to the holder, and urging means for pressing the holder to the tool attaching surface by urging the engaging member in a direction in which the engaging member is drawn to the holder side.

Preferably, the urging member is a cam provided in a connecting portion between the holder and the engaging member.

According to such a constitution, only by relaxing the attaching of the holder to the holder body, the engaging position between the holder and the holder body can be easily changed.

Further preferably, the engaging portions are formed on a plurality of surfaces of the holder. In this case, the engaging member of the attaching means is rotatably provided around the connecting portion between the holder and the engaging member, and the connecting portion is provided in a position equidistant from the engaging portions provided on the plurality of surfaces.

According to such a constitution, only by relaxing the attaching of the holder to the holder body, and pressing the engaging member again by changing a direction of the holder, different tools can be attached to the common holder to machine the work. In addition, by providing the engaging portions on the plurality of surfaces of the holder, the tool holder can be attached to the tool rest such that the attaching direction of the tool to the tool rest can be set parallel or perpendicular to each of the spindles rotated by gripping the work. Hence, versatility of the holder can be enhanced.

The present invention provides a work machining method using a tool holder which comprises fixing a work at a predetermined position, attaching a tool for machining the work to a tool rest, and then carrying out the machining of the work by the tool based on relative movements or rotations of the work and the tool rest, said method comprising the steps of preparing a tool holder including a holder body attached to the tool rest, a plurality of tool attaching surfaces formed around the holder body, a holder which is attached to the tool attaching surface and to which the tool for machining the work is attached, a toothed portion of a tooth-shaped row formed in a predetermined direction on the tool attaching surface, an engaging portion formed on the holder surface attached to the tool attaching surface and engaged with the toothed portion to position the holder in a predetermined position of the tool attaching surface, and attaching means for attaching the holder to the holder body in an engaging state where the toothed portion is engaged with the engaging portion; attaching a plurality of tools to the tool holder to attach them to the tool rest; and machining a plurality of works by the plurality of tools attached to the tool holder.

Especially, the invention is directed to a work machining method, which comprises the steps of preparing a machine tool including first and second spindle stocks arranged oppositely to each other, first and second spindles supported on the first and second spindle stocks, respectively, and at least one tool rest for attaching tools which machine works gripped by the first and second spindles; attaching first and second tools directed respectively to the first and second spindle stock sides to the tool holder; moving the tool rest in a direction of a Z1 axis parallel to an axis of the first spindle and a direction of an X1 axis orthogonal thereto; setting the second spindle stock movable in a direction of an X2 axis parallel to the X1 axis of the tool rest and a direction of a Z2 axis parallel to the Z1 axis; superposing a movement of the second spindle stock in the direction of the X2 axis necessary for machining the work by the second tool on a movement in the direction of the X1 axis, superposing a movement of the second spindle stock in the direction of the Z2 axis necessary for machining the work by the second tool on a movement of the direction of the Z1 axis, and moving the second spindle stock in the directions of the X2 and Z2 axis; and simultaneously carrying out machining operations of the works of the first and second spindles by the first and second tools.

BRIEF DESCRIPTION OF THE DRAWINGS

FIG. 9(a) a schematic view showing an initial state when machining is started; and FIG. 9(b) also a schematic view showing a simultaneous machining state of the works attached to the two spindles.

BEST MODE FOR CARRYING OUT THE INVENTION

Next, detailed description will be made of the preferred embodiments of the present invention with reference to the accompanying drawings.

Figure 1:
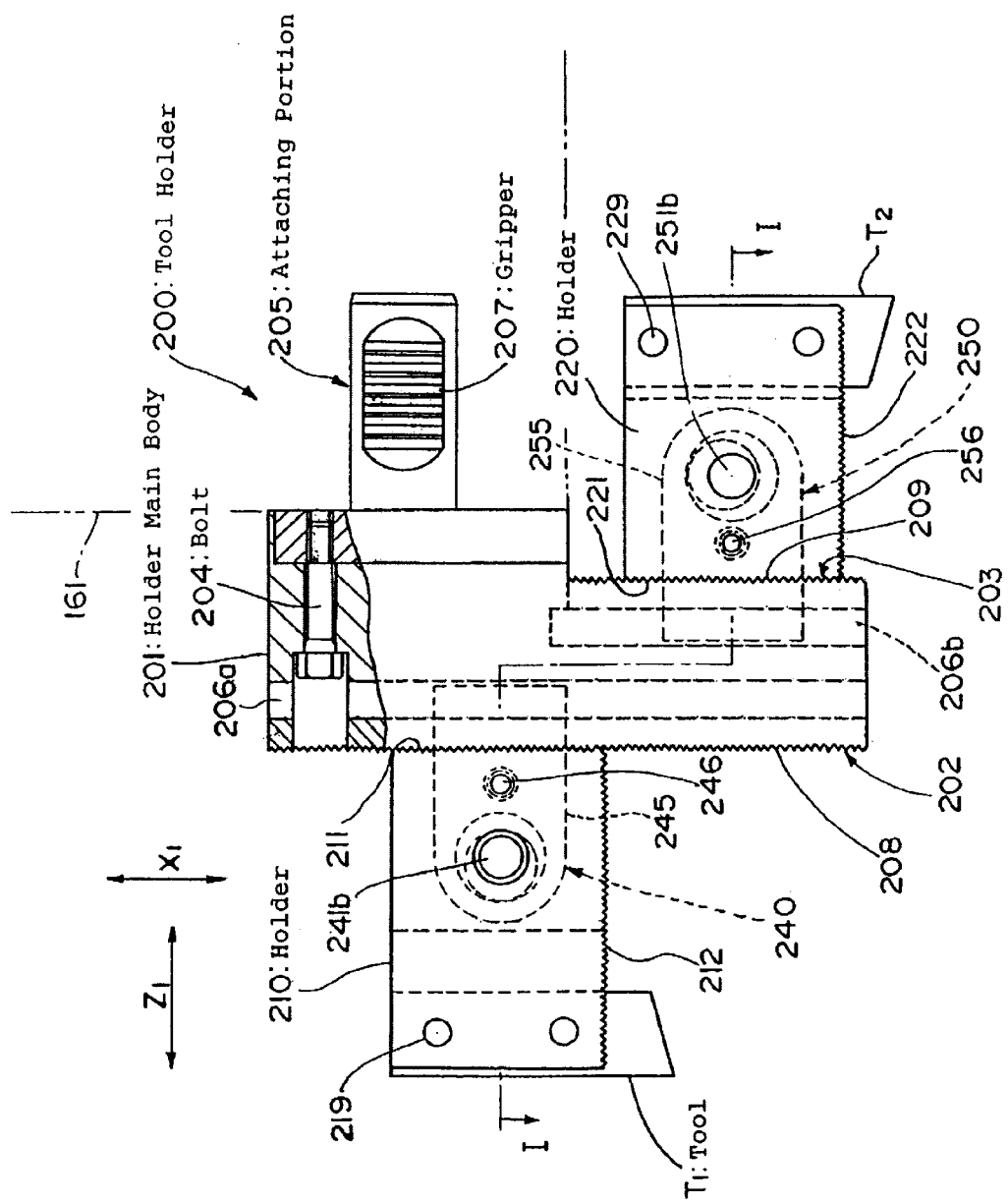
FIG. 1 is a partially broken front view of a tool holder according to an embodiment of the present invention.
Figure 2:
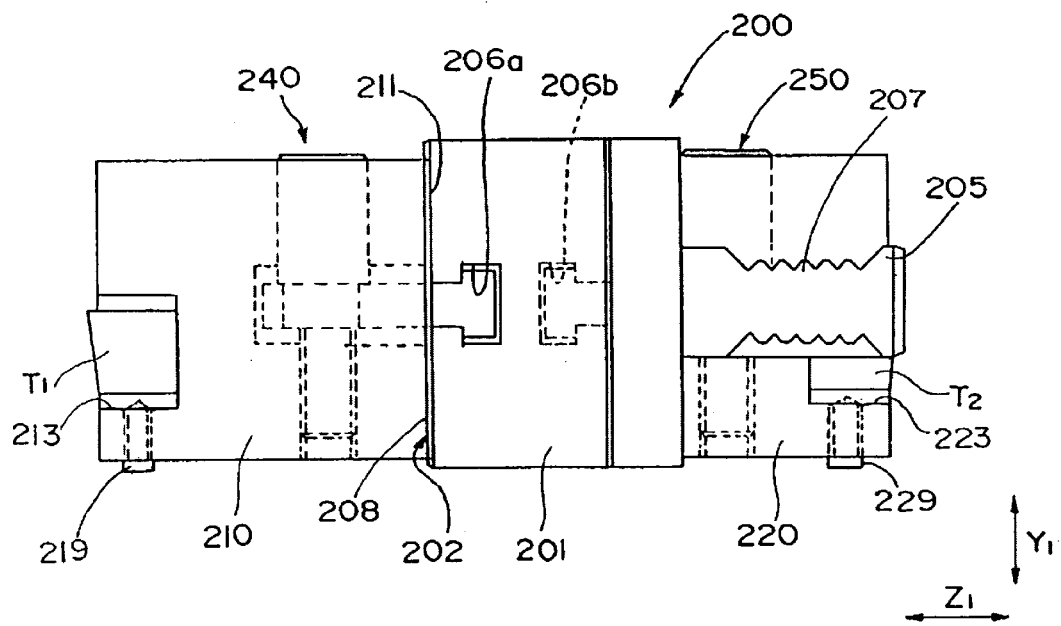
FIG. 2 is a plan view of the tool holder of FIG. 1.
Figure 3:
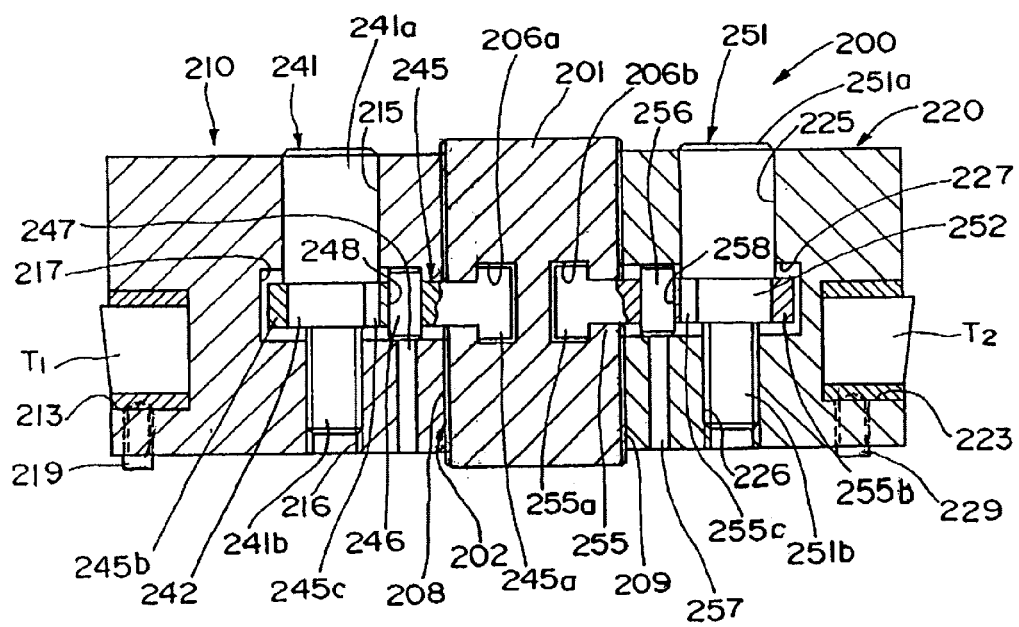
FIG. 3 is a sectional view taken on line I–I of the tool holder of FIG. 1.

Each of FIGS. 1 to 3 shows in detail a tool holder for attaching two tools T1 and T2 to the same station of a tool rest.

FIG. 1 is a partially broken front view of a tool holder according to an embodiment of the present invention; FIG. 2 a plan view of the tool holder of FIG. 1; and FIG. 3 a sectional view taken on line I–I of the tool holder of FIG. 1.

A tool holder 200 comprises an attached portion 205 inserted and fixed in an attaching hole of a turret plate 161 of a not-shown tool rest, a holder body 201 attached to the attaching portion 205 by a bolt 204, a first holder 210 attached to a surface 202 opposite the attaching portion 205 of the holder body 201, and a second holder 220 attached to a surface 203 on the same side as that of the attaching portion 205 of the holder body 201.

When the attaching portion 205 is inserted into the attaching hole of the turret plate 361, a not-shown clamper holds a gripper 207 formed in a part of the attaching portion 205 to pull the holder body 201 into the attaching hole, and fixes the tool holder 200 on the turret plate 161.

On the surface 202 of the holder body 201 opposite the attaching portion 205, many rows of triangular teeth extended in directions orthogonal to X1 and Z1 axis are formed at equal intervals in a direction of the X1 axis to form a toothed portion 208.

On the surface 203 of the holder body 201 on the same side as that of the attaching portion 205, many rows of teeth similar in shape to the teeth of the toothed portion 208 are formed at intervals similar to those of the toothed portion 208 to form a toothed portion 209.

A tool attaching groove 213 is formed in an end of the first holder 210, and a tool T1 is attached to this tool attaching groove 213 by a bolt 219 or the like. Similarly, a tool attaching groove 223 is formed in an end of the second holder 220, and a tool T2 is attached to this tool attaching groove 223 by a bolt 229 or the like.

On a side face of the first holder 210, an engaging portion 211 having a row of teeth is formed to be engaged with the toothed portion 208. Similarly, on a side face of the second holder 220, an engaging portion 221 having a row of teeth is formed to be engaged with the toothed portion 209.

By properly selecting respective engaging positions between the toothed portions 208 and 209 and the engaging portions 211 and 221, the tools T1 and T2 can be adjusted in an optimal positional relation.

The first and second holders 210 and 220 may be attached to the holder body 201 by bolts. However, by employing attaching means 240 and 250 described below, it is possible to further facilitate an adjustment of a positional relation between the first and second holders 210 and 220.

Configurations of the attaching means 240 and 250 are illustrated best in FIG. 3.

The holder body 201 includes a dovetail groove 206a as an engaging groove extended in the direction of the X1 axis formed along the surface 202, and a dovetail groove 206b formed along the surface 203 to be parallel to the dovetail groove 206a. In FIGS. 1 to 3, the dovetail grooves 206a and 206b are shown to be T-shaped in section, and explanation is made on the assumption that T-shaped dovetail portions 245a and 255a of later-described levers 245 and 255 are engaged with the T-shape dovetail grooves 206a and 206b. However, as long as engagement is firmly carried out between the dovetail groove and the dovetail portion, the shape is not limited to the T shape, and other shapes such as a trapezoid, and a semicircular-arc may be used.

The first and second holders 210 and 220 are concaved in section as shown in FIG. 3. Then, in a state where the first and second holders 210 and 220 are attached to the holder body 201, a concave portion 217 of the first holder 210 is communicated with the dovetail groove 206a, and a concave portion 227 of the second holder 220 with the dovetail groove 206b.

The lever 245 as an engaging member is provided in the concave portion 217, and the lever 255 as an engaging member in the concave portion 227. The dovetail portion 245a is formed in one end of the lever 245 to be engaged with the dovetail groove 206a, and a through-hole 245c is formed in the other end in directions orthogonal to X1 and Z1 axis. Similarly, the dovetail portion 255a is formed in one end of the lever 255 to be engaged with the dovetail groove 206b, and a through-hole 255c is formed in the other end in directions orthogonal to the X1 and Z1 axis.

On one side face of the first holder 210, A hole 215 is formed to transverse the concave portion 217 and be extended in a transverse direction orthogonal to the X1 and Z1 axis. Similarly, on a side face of the second holder 220, a hole 225 is formed to transverse the concave portion 227 and be extended in a transverse direction. Parts of the holes 215 and 225 are formed as screw holes 216 and 226.

A shaft 241 having a screw portion 241b is inserted into the hole 215. The screw portion 241b is screwed through the concave portion 227 and the through-hole 245c of the lever 245 into the screw hole 216. Similarly, a shaft 251 is inserted into the hole 255, and its screw portion 251b is screwed through the concave portion 227 and the through-hole 255c of the lever 255 into the screw hole 226. By the shaft bodies 241 and 151, the levers 245 and 255 are connected to the holders 210 and 220.

A cam 242 is formed between a head portion 241a of the shaft 241 and the screw shaft 241b, and this cam 242 is positioned in the hole portion 245c. When the head portion 241a is rotated, the cam 242 is abutted on an inner wall 245b of the hole portion 245c to push the lever 245 in a direction away from the holder body 201. Since the T-shaped dovetail portion 245a is engaged with the T-shaped dovetail groove 206a, by pushing the lever 245 in the direction away from the holder body 201, the first holder 210 is pressed to the holder body 201 by its reactive force. Similarly, a cam 252 is formed between a head portion 251a of the shaft 251 and the screw shaft 251b, and this cam 252 is positioned in the hole portion 255c. When the head portion 251a is rotated, the cam 252 is abutted on an inner wall 255b of the hole portion 255c to press the second holder 220 to the holder body 201.

In the head portions 241a and 251a of the shaft bodies 241 and 251, for example, hexagonal or tetragonal square holes, concave portions such as grooves, hexagonal or tetragonal square projections or the like may be formed to engage tools for rotating the shaft bodies 241 and 251.

In the foregoing manner, the first and second holders 210 and 220 are attached to the holder body 201. In this case, since the toothed portions 208 and 209 are respectively engaged with the engaging portions 211 and 221, movements of the first and second holders 210 and 220 in the direction of the X1 axis are regulated.

As shown in FIG. 3, according to the embodiment, bolts 246 and 256 having holes are provided as adjusting means for fine adjusting positions of the first and second holders 210 and 220 in the same direction (referred to as transverse direction, hereinafter) as that of the teeth of the toothed portion 208. The levers 245 and 255 include screw holes 248 and 258 formed in a transverse direction, and the bolts 246 and 256 having holes are inserted into these screw holes 248 and 258. The bolts 246 and 256 having holes are nearly equal or slightly shorter in length to widths of the concave portions 217 and 227. On axial extensions of the screw holes 248 and 258, holes 247 and 257 are formed to be opened to the side faces of the first and second holders 210 and 220, and have diameters smaller than outer diameters of the bolts 246 and 256 having holes.

When tools such as bar wrenches are inserted from the side faces of the first and second holders 210 and 220 into the holes 247 and 257 as tool inserting portions, and tips of the tools are engaged with the bolts 246 and 256 having holes to rotate the bolts 246 and 256 having bolts, the bolts 246 and 256 having bolts are abutted on side walls of the concave portions 217 and 227 to be restrained for movements. Accordingly, by impelling forces of the bolts 246 and 256 having bolts, the first and second holders 210 and 220 are moved in the transverse direction. Thus, it is possible to fine adjust the attaching positions of the first and second holders in the transverse direction.

Bolts are not limited to the bolts having hole, and other bolts may be used. Tools may be properly selected according to the bolts to be used. Further, the tool inserting portions for engaging the tools with the bolts are the holes 247 and 257. However, grooves or concave portions may be used.

Figure 4:
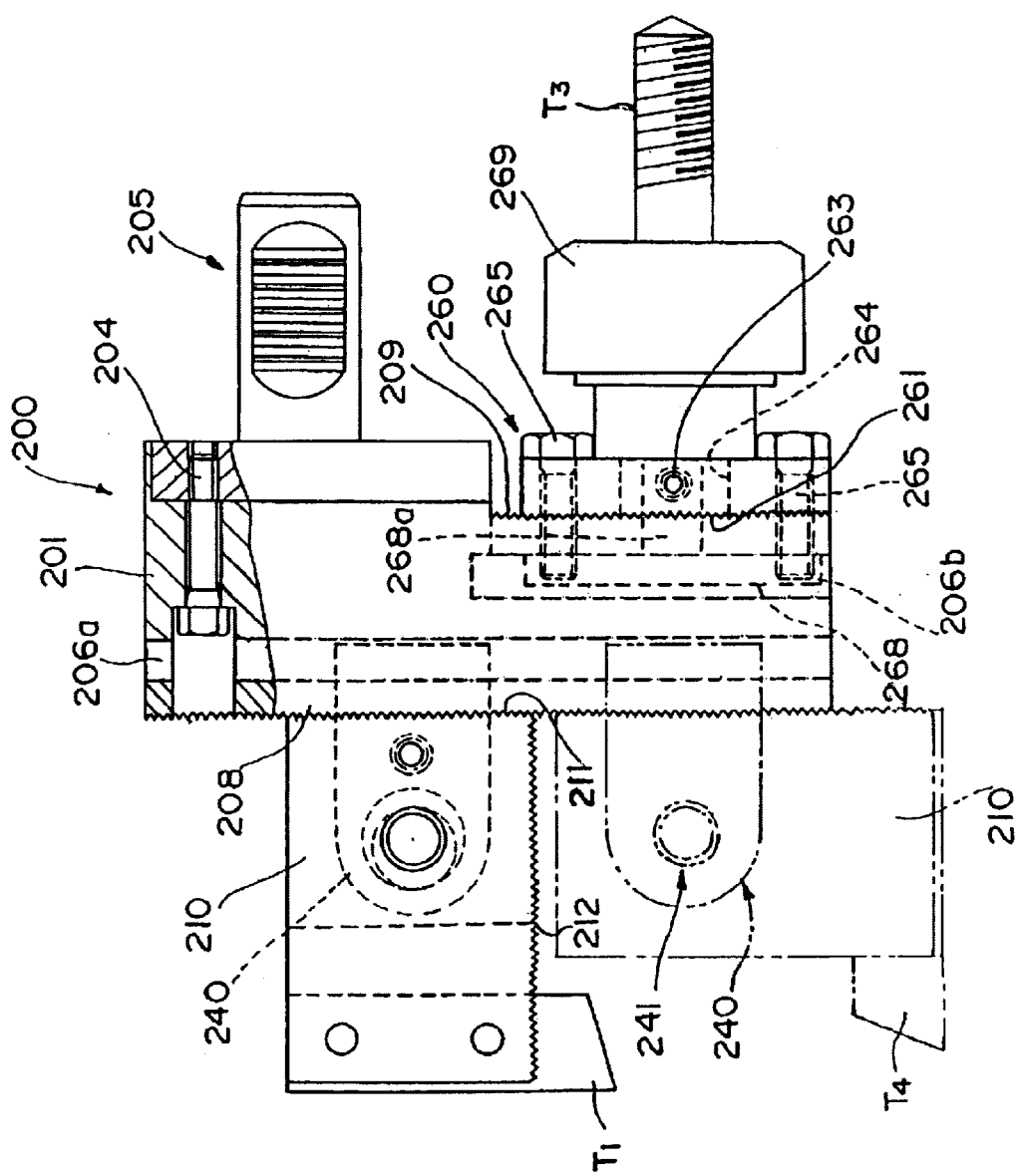
FIG. 4 is a front view showing an example of using another tool attached to the tool holder of the invention.

FIG. 4 shows a state where another tool T3 such as a drill is attached to the tool holder 200.

The tool T3 is attached to a third holder 260 attached to the surface 203 of the holder body 201 by inserting a base of the tool T3 into not-shown collet chuck or tapered engagement gripping means, and fastening a fastening member 269. The collet chuck or tapered engagement gripping means is well-known, and thus drawing and detailed description are omitted.

The third holder 260 is engaged with the dovetail groove 206b, and attached to a T-shaped slider 268 slid in a direction of an X2 axis along the dovetail groove 206b by a bolt 265. On one side of the third holder 260, an engaging portion 261 is formed to be engaged with the toothed portion 209. Then, by inserting the bolt 265 from the third holder 260 side into a not-shown screw hole of the slider 268, the holder 260 is attached to the slider 268, and the engaging portion 261 is engaged with the toothed portion 209 to regulate a movement of the third holder 260 in the direction of the X2 axis.

In the third holder 260, a concave portion 264 is formed, which is similar to the concaved portions 217 and 227 shown in FIGS. 1 to 3. In this concave portion 264, a bolt 263 for fine adjusting a position of the tool T3 in the same direction as that of the teeth of the toothed portion 209 is inserted into a screw hole of a leg portion 268a extended from the slider 268 into the concave portion 264. Thus, by rotating the bolt 263, as in the case of the first and second holders 210 and 220 of the previous embodiment, it is possible to fine adjust the attaching position of the tool T3.

FIG. 4 shows another attaching mode of the tool holder attached to the holder body 201 by changing a direction of the first holder 210 by a chain line.

On a surface other than the surface where the engaging portion 211 is formed, for example, on the other surface orthogonal to the surface of the engaging portion 211 as shown in FIGS. 1 and 4, an engaging portion 212 is formed to be engaged with the toothed portion 208. Thus, by changing its direction of by 90°, the first holder 210 can be attached to the holder body 201.

Similarly, for the second holder 220 shown in FIGS. 1 to 3, by forming an engaging portion 222 other than the engaging portion 221, the second holder 220 can be attached to the holder body 201 by changing its direction.

In this case, a center of the shaft 241 is set in a position equidistant from the engaging portions 211 and 212, and the lever 245 can be freely rotated around the shaft 241 in the concave portion 217. Accordingly, the direction of the first holder 210 can be easily changed without any necessity of changing the lever 245. Similarly, a center of the shaft 252 is set in a position equidistant from the engaging portions 221 and 222, and the lever 255 can be freely rotated in the concave portion 227, the direction of the second holder 220 can be easily changed without any necessity of changing the lever 255.

Therefore, many more types of other tools (tool T4 in an example of FIG. 4) can be attached to the first and second holders 210 and 220, making it possible to enhance versatility of the first and second holders 210 and 220.

Next, description will be made of a machining method of the present invention.

Figure 5:
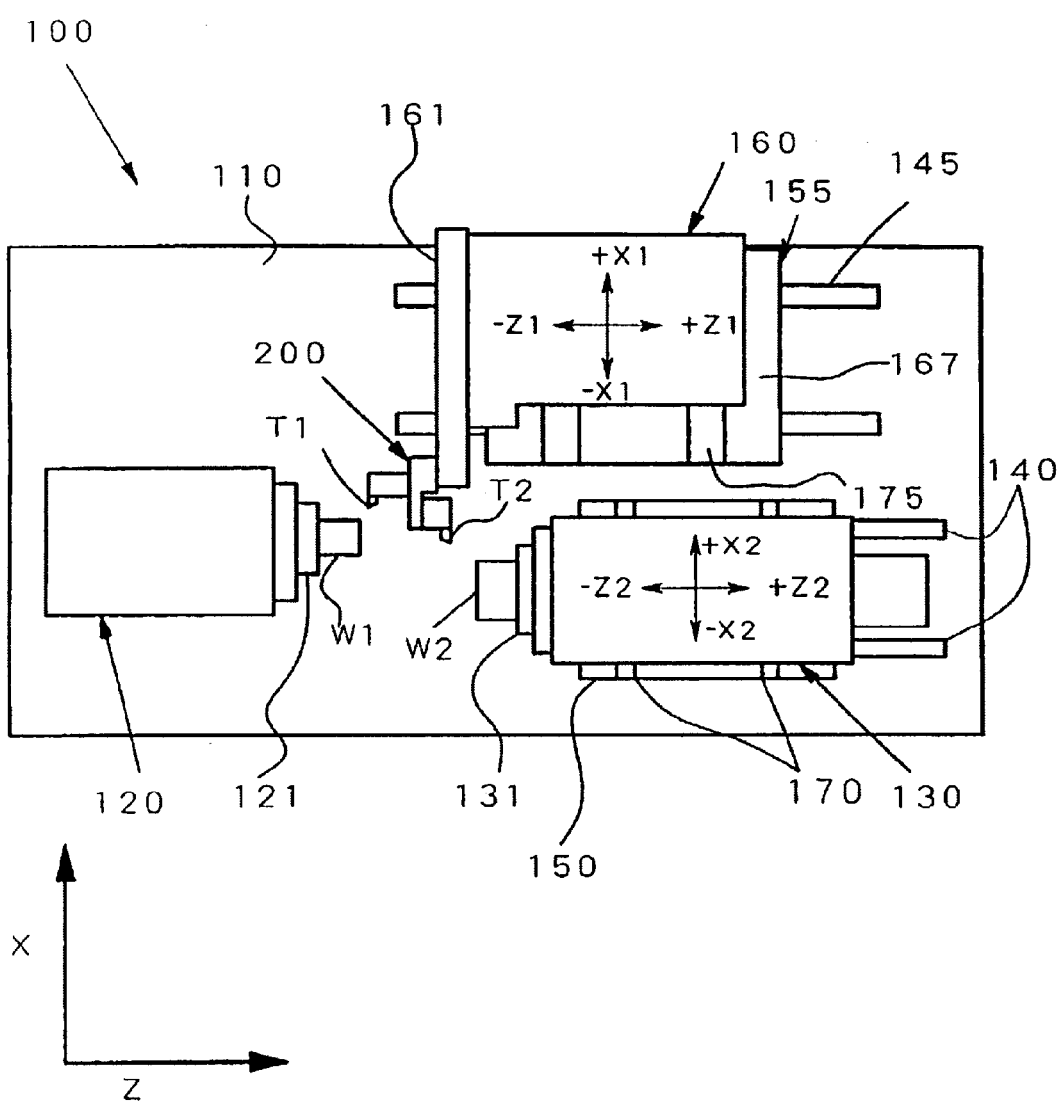
FIG. 5 is a plan view illustrating a schematic configuration of an exemplary NC lathe for machining a work by using the tool holder of the invention.
Figure 6:
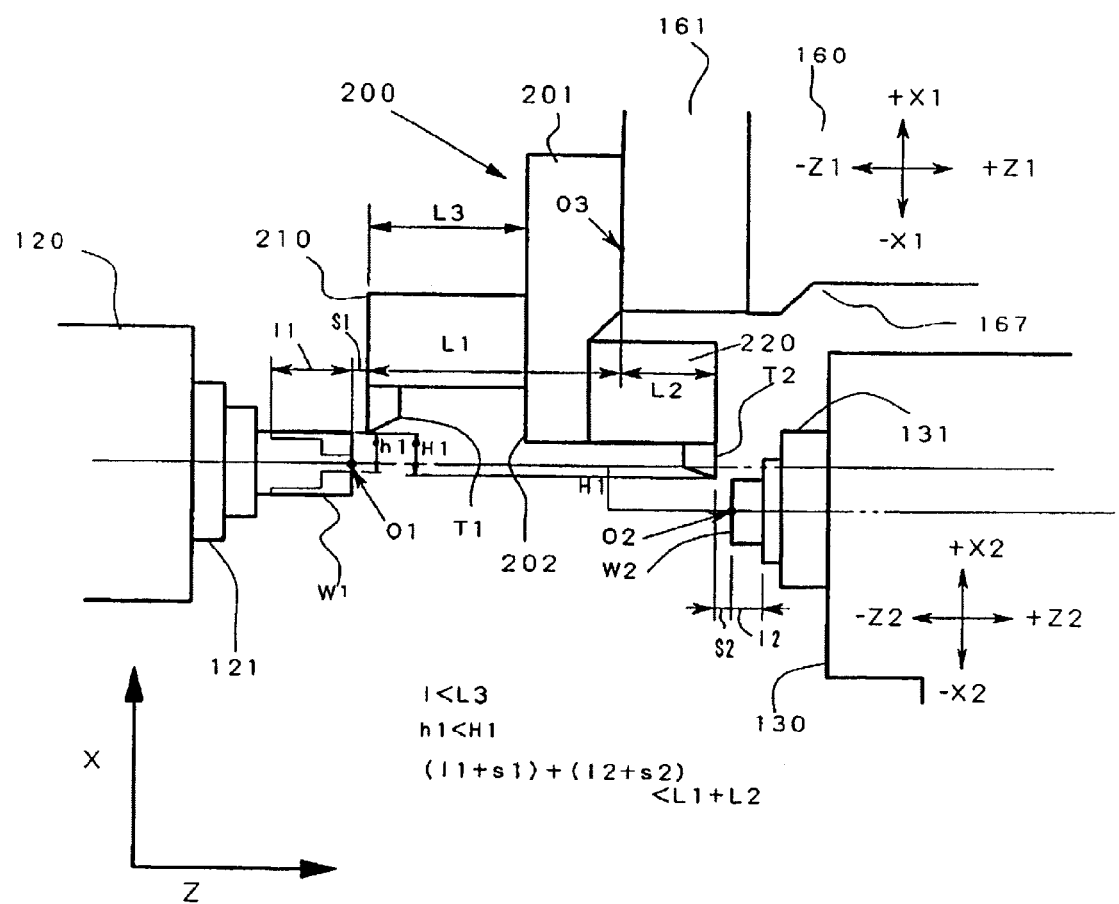
FIG. 6 is a view illustrating a positional relation between tools of a tool rest and works attached to opposing spindles in the NC lathe of FIG. 5.

FIG. 5 is a schematic configuration view of an NC lathe for machining a wok by using the tool holder of the present invention. FIG. 6 is a partially expanded view of FIG. 5 illustrating a positional relation between a tool rest and two spindle stocks.

A bed 110 of an NC lathe 100 includes first and second spindle stocks 120 and 130 arranged oppositely to each other. The first spindle stock 120 rotatably supports a first spindle 121, and the second spindle stock 130 rotatably supports a second spindle 131. Well-known chucks (not shown) are provided in tips of the first and second spindles 121 and 131, and works W1 and W2 can be gripped by these chucks.

According to the described embodiment, the first spindle stock 120 is fixed to the bed 110. The bed 110 includes a guide rail 140 provided in a direction parallel to a Z axis. A saddle 150 is mounted on the guide rail 140. The saddle 150 is moved in a direction of a Z2 axis parallel to the Z axis by a not-shown motor as a driver while being guided by the guide rail 140.

On the saddle 150, a guide rail 170 is provided in a direction parallel to an X axis orthogonal to the Z axis. The second spindle stock 130 is moved in a direction of an X2 axis parallel to the X axis by driving of a not-shown driver while being guided by the guide rail 170. The bed 110 includes a guide rail 145 provided in parallel to the guide rail 140. A saddle 155 is mounted on the guide rail 145. This saddle 155 is moved in the direction of the Z1 axis parallel to the Z axis by a not-shown servo motor as a driver while being guided by the guide rail 145.

On an upper surface of the saddle 155, a guide rail 175 is provided in a direction parallel to the X axis. A tool rest 160 is mounted on the guide rail 175, and moved in the direction of the X1 axis by driving of a not shown servo motor as a driver while being guided by the guide rail 175.

The tool rest 160 includes a turret plate 161 provided on one side so as to be freely divided and rotated. A plurality of tools T1 are attached to the turret plate 161 to machine the work W1 gripped by the first spindle 121. By the movement of the tool rest 160 in the direction of the X1 axis and the movement of the saddle 155 in the direction of the Z1 axis, the tools T1 are set in predetermined positions with respect to the work W1, and machine the work W1 while being moved with respect to the work W1.

In the turret plate 161, a tool T2 as a second tool is fixed to the same position (same station) as the attaching position of the tool T1 as a first tool to machine the work W2 gripped by the second spindle 131. By feeding of the second spindle stock 130 in the direction of the X2 axis, in which a feeding speed of the direction of the X axis for machining the work W2 is superposed on a feeding speed of the tool rest 160 in the direction of the X1 axis, and feeding of the second spindle stock 130 in the direction of the X2 axis, in which a feeding speed of the direction of the Z axis for machining the work W2 is superposed on a feeding speed of the tool rest 160 in the direction of the Z1 axis, the tool T2 is positioned and moved with respect to the work W2 to machine the same.

FIG. 6 shows in expansion main portions of the tool rest 160.

The tool holder 200 having the tools T1 and T2 attached thereto are attached to the turret plate 161.

For the first and second holders 210 and 220, in simultaneous machining of the works W1 and W2 by the tools T1 and T2, a size of each portion is decided so as to prevent one work (e.g., work W1) from interfering with the other work (e.g., work W2), the other tool (e.g., tool T2), a holder (e.g., second holder 220), or the holder body.

In the tool holder 200 shown in FIG. 6, a distance L3 of the Z-axis direction from a edge of the tool T1 to the surface 202 of the holder body 201 is decided larger than a machining length l1 of the work W1. The tool rest 160 includes a run off 167 formed so as to prevent interference between the second spindle stock 130 and the tool rest 160, and increase a stroke of the X1-axis direction of the tool rest 160 and a stroke of the X2-axis direction of the second spindle stock 130 as much as possible.

As shown, preferably, a positional relation between the tools T1 and T2 is set in a manner that a tip of the tool T2 is set in a position farther from the tool rest 160 than a tip of the tool T1.

More preferably, a distance H1 of the X-axis direction between edges of the tools T1 and T2 is set larger than a maximum driving-in amount of the X1-axis direction when the tool T1 machines the work W1.

An increase of the running-off amount of the run off 167 of the tool rest 160 is made unnecessary by an amount equal to the distance of the X-axis direction between the edges of the tools T1 and T2. Accordingly, by increasing a width of the second spindle stock 130 on the tool rest 160 side, it is possible to maintain high rigidity of the second spindle stock 130. Also for the tool rest 160, since rigidity is affected by the running-off amount of the run off 167, by the distance of the X1-axis direction between the edges of the tools T1 and T2, it is possible to maintain high rigidity of the tool rest 160.

Accordingly, the NC lathe can be miniaturized without miniaturizing the second spindle stock 130 or enlarging the run off 167 of the tool rest 160.

Preferably, a distance L1+L2 of the Z-axis direction between the edges of the tools T1 and T2 is set larger than a distance obtained by adding together a maximum moving amount l1+s1 of the Z1-axis direction when the tool T1 machines the work W1, and a maximum moving amount l2+s2 of the Z2-axis direction when the tool T2 machines the work W2.

Thus, it is possible to prevent interference between the works W1 and W2 subjected to superposed machining.

In the NC lathe thus constructed, a machining method is frequently use, which the work W1 is transferred to the second spindle 131 after a front side of the work W1 gripped by the first spindle 121 is machined, and a backside is then machined. Accordingly, it is necessary to match an axis of the second spindle 131 with an axis of the first spindle 121. Preferably, however, a stroke of the X-axis direction of the second spindle 131 on the tool rest 160 side is stretched to a position where it can be at least concentric to the axis of the first spindle 121.

Explanation of Controller

Figure 7:
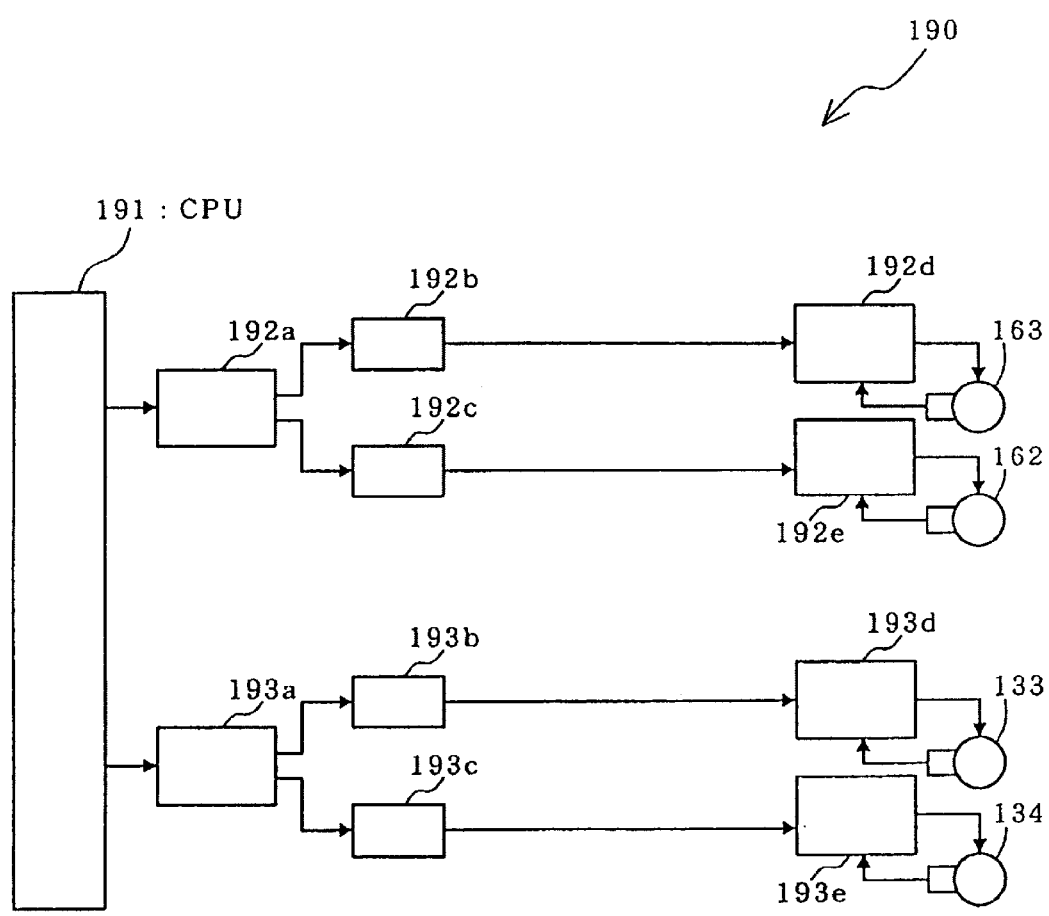
FIG. 7 is a block diagram of a controller in the NC lathe of FIG. 5.

FIG. 7 shows a control block diagram of a controller in the NC lathe 100.

A controller 190 includes a central processing unit (CPU) 191, a first arithmetic processing circuit 192a for controlling the movement of the tool rest 160 in the directions of the Z1 and X1 axis by a command from the CPU 191, speed processing circuits 192b and 192c for outputting speed signals of the directions of the X1 and Z1 axis based on an output signal from the first arithmetic processing circuit 192a, and servo processing circuits 192d and 192e for driving the servo motors 163 and 162 to move the tool rest 160 in the directions of the X1 and Z1 axis at a predetermined speed based on output signals from the speed processing circuits 192b and 192c.

Similarly, the controller 190 includes a second arithmetic processing circuit 193a for controlling the movement of the second spindle stock 130 in the directions of the Z2 and X2 axis by a command from the CPU 191, speed processing circuits 193b and 193c for outputting speed signals of the directions of the X2 and Z2 axis based on an output signal from the second arithmetic processing circuit 193a, and servo processing circuits 193d and 193e for driving the servo motors 133 and 134 to move the second spindle stock 130 in the directions of the X2 and Z2 axis at a predetermined speed based on output signals from the speed processing circuits 193b and 193c.

The CPU 191 adds a moving command in the directions of the Z and X axis necessary for machining the work W2 to a moving command in the directions of the Z1 and X1 axis, issues a moving command in the directions of the Z2 and X2 axis, and superposes a moving speed of the second spindle stock 130 on the movement of the tool rest 160.

The above-described superposition can be carried out by a controller of the other configuration.

Figure 8:
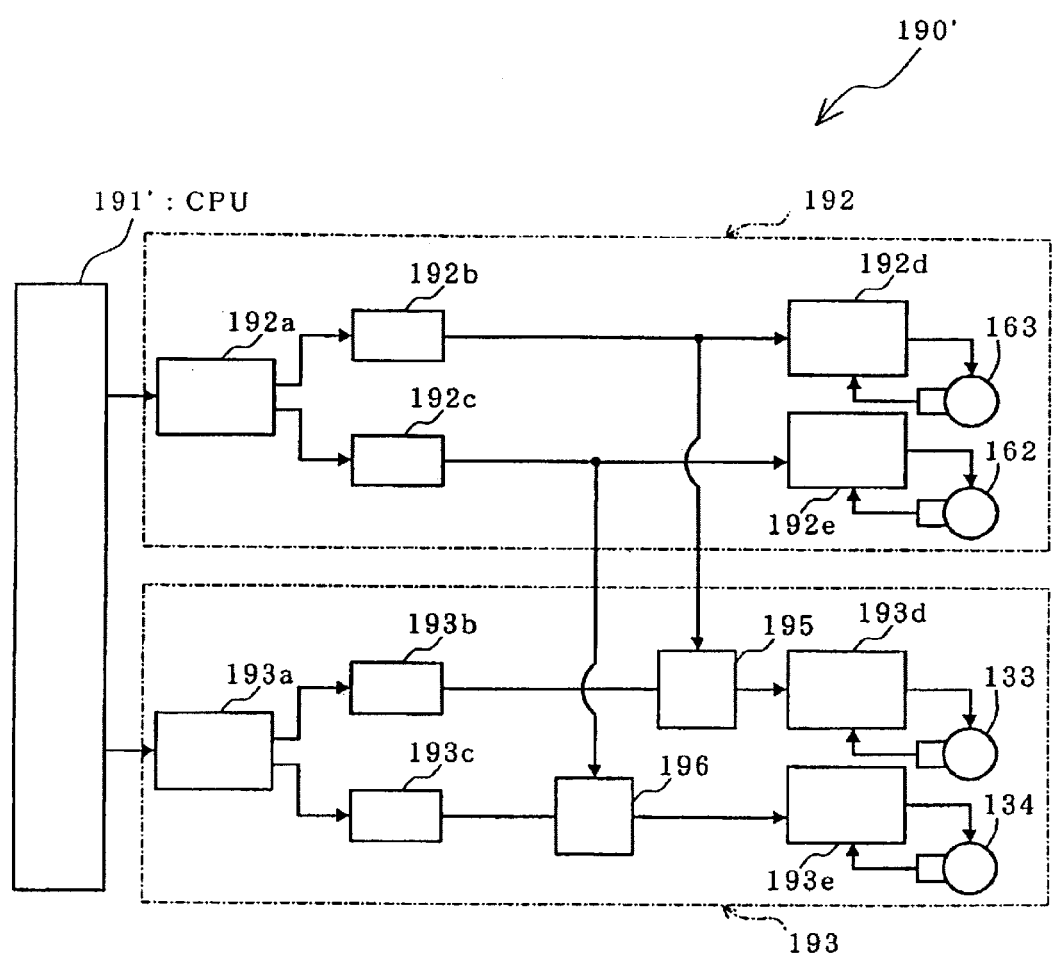
FIG. 8 is a block diagram showing another example of a controller in the NC lathe of FIG. 5.

FIG. 8 is a control block diagram of a controller of another embodiment in the NC lathe 100.

In FIG. 8, portions similar to those of the controller of FIG. 7 are denoted by similar reference numerals, and detailed description thereof is omitted.

A controller 190' includes a central processing unit (CPU) 191', a first control system 192 for controlling the movement of the tool rest 160 in the directions of the Z1 and X1 axis by a command from the CPU 191', and a second control system 193 for controlling the movement of the second spindle stock 130 in the directions of the Z2 and X2 axis by a command from the CPU 191.

The first control system 192 includes a first arithmetic processing circuit 193a, speed processing circuits 192b and 192c, and servo processing circuits 192d and 192e.

Similarly, the second control system 193 includes a first arithmetic processing circuit 193a, speed processing circuits 193b and 193c, and servo processing circuits 192d and 192e.

The second control system 193 further includes superposing circuits 195 and 196 provided between the speed processing circuits 193b and 193c and the servo processing circuits 193d and 193e.

The superposing circuit 195 adds a feeding command (relative feeding command of the work W2 and the tool T2) of the second spindle stock 130 in the direction of the X axis for machining the work W2 by the tool T2 to a feeding command of the tool rest 160 in the direction of the X1 axis, and outputs its result as a feeding command of the second spindle stock 130 in the direction of the X2 axis to the servo processing circuit 193d.

The superposing circuit 196 adds a feeding command (relative feeding command of the work W2 and the tool T2) of the second spindle stock 130 in the direction of the Z axis for machining the work W2 by the tool T2 to a feeding command of the tool rest 160 in the direction of the Z1 axis, and outputs its result as a feeding command of the second spindle stock 130 in the direction of the Z2 axis to the servo processing circuit 193e.

According to the controller 190', a feeding command of the tool T1 in the directions of the X1 and Z1 axis for machining the work W1 is outputted from the CPU 191' to the first control system 192, and a feeding command (relative feeding command of the work W2 and the tool T2) of the tool T2 in the directions of the X and Z axis for machining the work W2 is outputted from the CPU 191 to the second control system 193.

The first control system 192 moves the tool T1 together with the tool rest 160 based on an output from the CPU 191'. The second control system 193 adds a feeding command of the tool rest 160 to a feeding command from the CPU 191', superposes a moving speed, and moves the second spindle stock 130.

Next, description will be made of an operation of the NC lathe having the forgoing configuration by referring to FIGS. 5 to FIGS. 9(a) and 9(b).

Figure 9A:
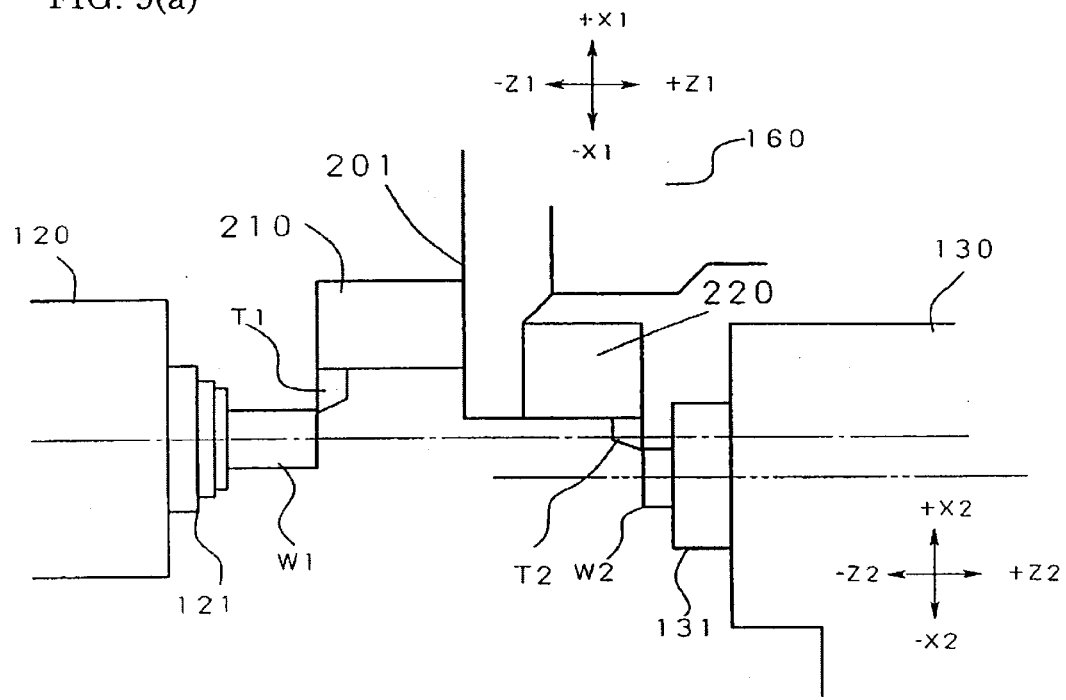
FIGS. 9(a) and 9(b) are explanatory views, each showing a machining method using the tool holder of the invention.
Figure 9B:
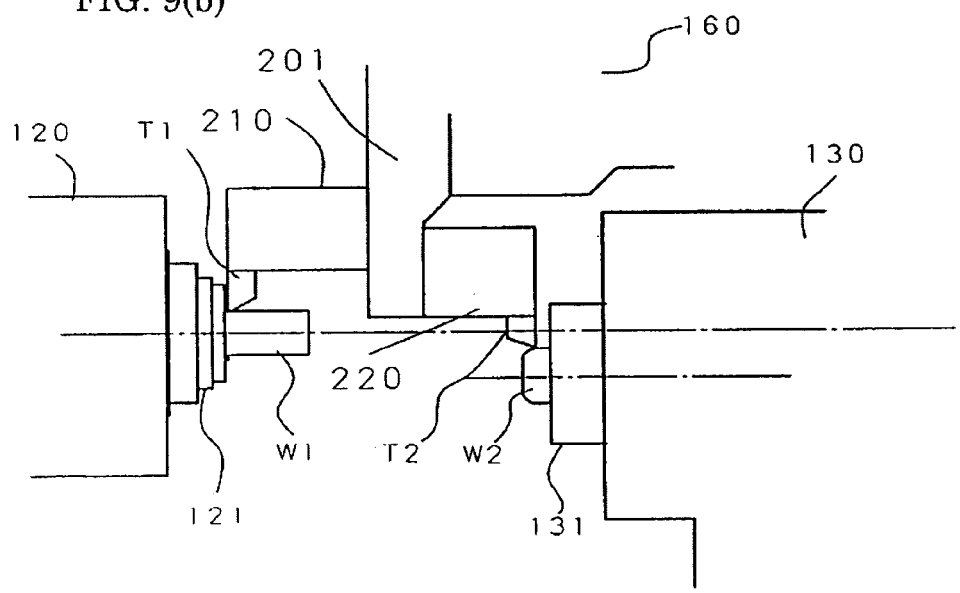

FIG. 9(a) shows a positional relation between each tool and each work in an initial state before a start of machining; FIG. 9(b) a positional relation between each tool and each work in machining.

In a standby state shown in FIG. 6, the tool rest 160 is in a position away from the first and second spindle stocks 120 and 130 so as to prevent interference between the tools T1 and T2 and the works W1 and W2 during divided rotation of the turret plate 161.

The first and second spindle stocks 120 and 130 are positioned so as to set machining origins O1 and O2 of the works W1 and W2 in predetermined positions. In the embodiment, the second spindle stock 130 is positioned so as to set the machining origin O2 of the work W2 in a position farther from the tool rest 160 than the machining origin O1 (located on axis of the first spindle 121) of the work W1.

To machine the work W1 by the tool T1, the tool rest 160 is moved from the standby position of FIG. 6 in the directions of the X1 and Z1 axis and, when it reaches an initial position shown in FIG. 9(a), a moving command equal to a feeding speed of the tool rest 160 in the directions of the X1 and Z1 axis is outputted from the first control system 192 to the second control system 193. This moving command is equal to the feeding speed of the tool rest 160, and the second spindle stock 130 can be moved in the same direction as the moving direction of the tool rest 160. Thus, when the tool rest 160 is moved in order to machine the work W1 by the tool T1, a positional relation between the tool T2 and the work W2 can be maintained constant.

In the superposing circuit 195, a moving command (relative feeding command of the tool T2 and the work W2) of the work W2 in the direction of the X axis with respect to the tool T2 in machining of the work W2 by the tool T2 is added to a feeding command of the tool rest 160 in the direction of the X1 axis. In the superposing circuit 196, a feeding command (relative feeding command of the tool T2 and the work W2) of the work W2 in the direction of the Z axis with respect to the tool T2 is added to a feeding command of the tool rest 160 in the direction of the Z1 axis. Then, results thereof are outputted to the motors 133 and 134.

Thus, as shown in FIG. 9(b), while the work W1 is machined by the tool T1, machining completely different from that of the work W1 can be carried out for the work W2.

In the machining examples shown in FIG. 6 and FIGS. 9(a) and 9(b), the tools T1 and T2 as the first and second tools are both turning tools for cutting.

According to the invention, it is possible to perform machining other than cutting for the work W1 or W2 by using a tool other than the turning tool for cutting as the first or second tool.

Other Machining Example

The other machining example using the NC lathe of the present invention is described below.

Figure 10A:
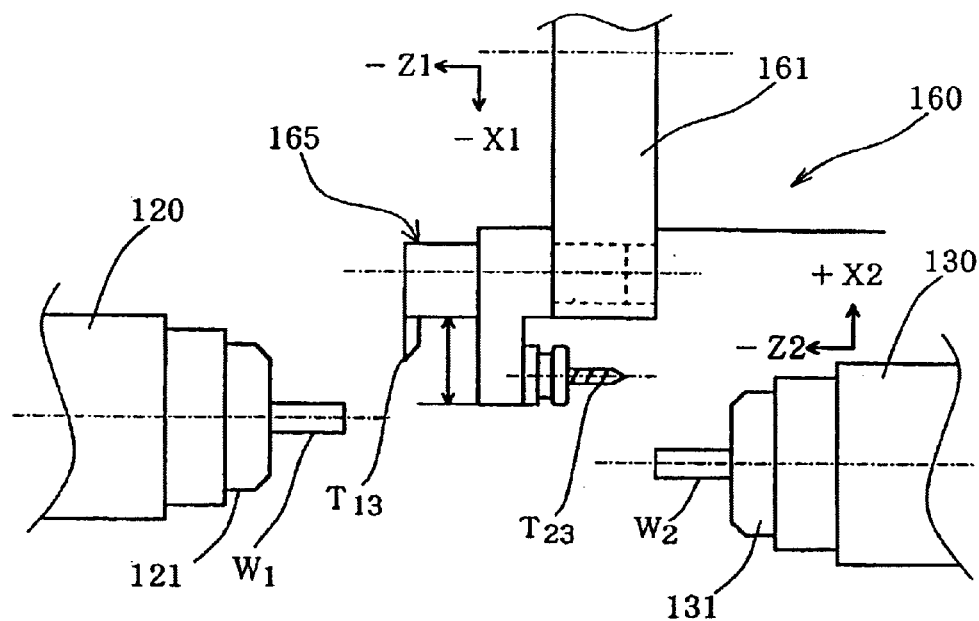
FIGS. 10(a) and 10(b) are views, each showing another example of method of machining a work by using the tool holder of the invention.
Figure 10B:
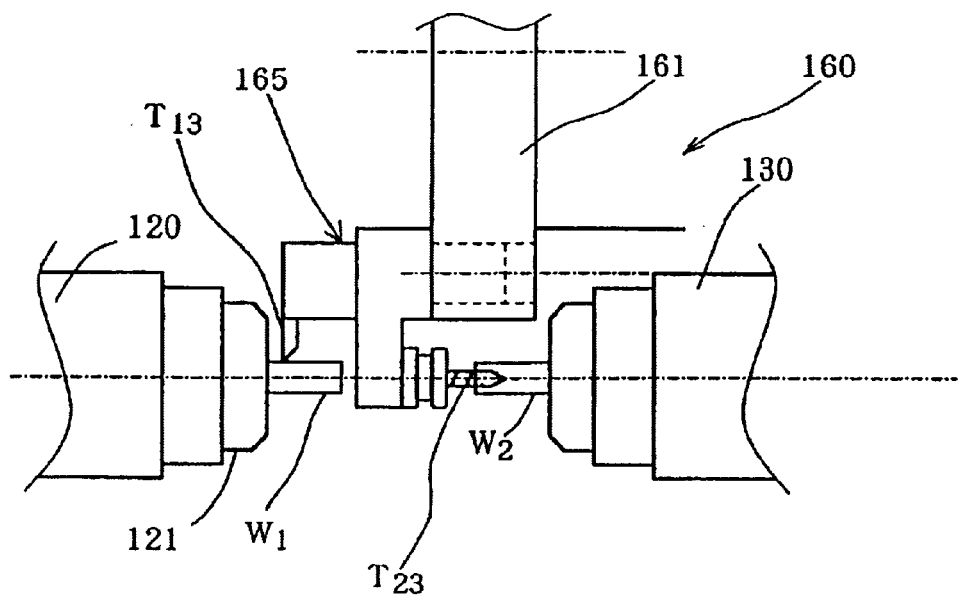

In a machining example shown in each of FIGS. 10(a) and 10(b), cutting is carried out for an outer peripheral surface of the work W1 by a turning tool T13, and drilling is carried out for an end surface of the work W2 by a drill T23.

In this case, feeding of the second spindle stock 130 in the directions of the Z2 and X2 axis must be superposed according to a cutting amount and a feeding amount of the turning tool T13.

In machining, the turning tool T13 is moved to the outer peripheral surface of the work W1, the tool rest 160 is fed in the directions of the Z1 and X1 axis, and the outer peripheral surface of the work W1 is cut. Simultaneously, at a feeding speed in which a feeding speed in the direction of the Z1 axis for machining the work W2 by the drill T23 is superposed on a feeding speed of the tool rest 160 in the direction of the Z1 axis, and at a feeding speed in which a feeding speed in the direction of the X2 axis is superposed on a feeding speed in the direction of the X1 axis, the second spindle stock 130 is fed in the directions of the Z2 and X2 axis, and drilling is carried out for the end surface of the work W2.

Second Embodiment

In a second embodiment described hereinafter, in addition to superpositions of the X1 and X2 axis, and the Z1 and Z2 axis, superposition of Z0 and Z1 axis is carried out.

Figure 11:
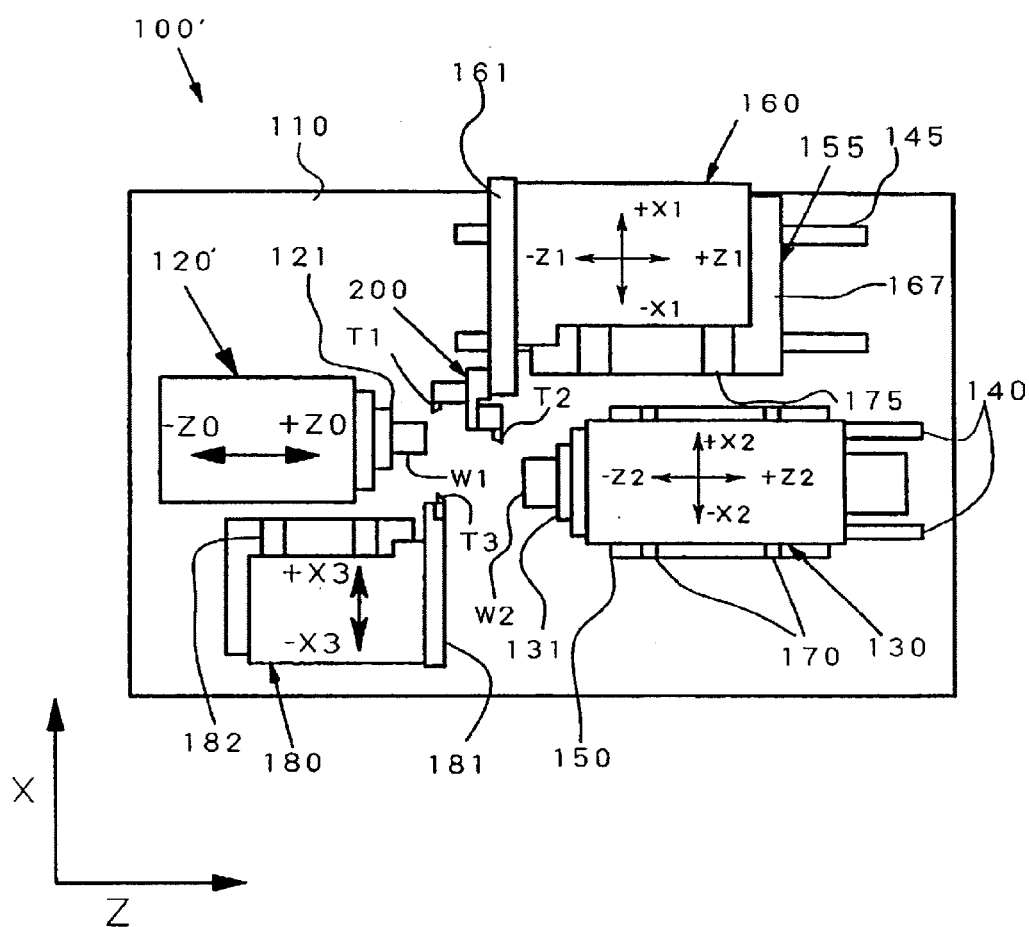
FIG. 11 is a plan view of another NC lathe in a case where machining is carried out with the tool holder of the invention is attached to a tool rest of this NC lathe.
Figure 12:
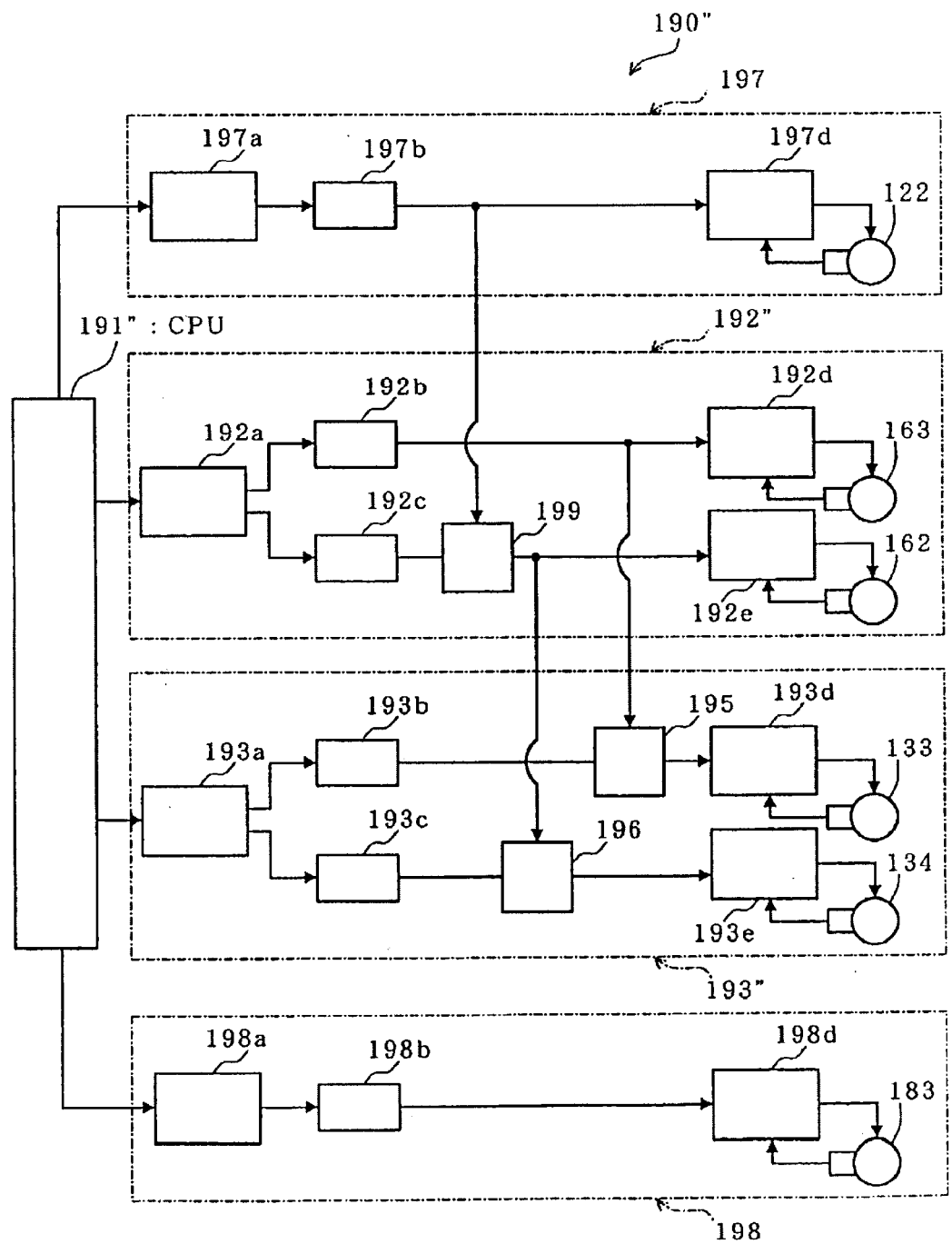
FIG. 12 is a block diagram showing a controller in the NC lathe of FIG. 11.

FIG. 11 is a plan view illustrating a schematic configuration of an NC lathe according to the second embodiment of the present invention: and FIG. 12 a control block diagram of a controller in the NC lathe.

In FIGS. 11 and 12, portions and members similar to those of the first embodiment are denoted by reference numerals similar to those of FIGS. 5, 7 and 8, and detailed description thereof is omitted.

A spindle stock 120' of an NC lathe 100' of the second embodiment can be freely moved in the direction of the axis Z0 parallel to a Z axis. A movement of the first spindle stock 120' in the direction of the axis Z0 is carried out by driving of a not-shown motor as a driver.

A second tool rest 180 is provided oppositely to a too rest 160. This second tool rest 180 can be freely moved in a direction of an X3 axis parallel to an X-axis along a guide rail 182 provided on a bed 110. The second tool rest 180 is moved in the direction of the X3 axis by driving of a not-shown motor as a driver.

A third tool T3 for machining a work W1 is attached to a turret surface 181 of the second tool rest 180. By the movement of the second tool rest 180 in the direction of the X3 axis, and the movement of the first spindle stock 120' in the direction of the axis Z0, the tool T3 is positioned and moved with respect to the work W1 to machine the work W1.

A controller 190" of the NC lathe 100' further includes a third control system 197 for moving the first spindle stock 120' in the direction of the Z0 axis, and a fourth control system 198 for moving the second tool rest 180 in the direction of the X3 axis.

The third and fourth control systems 197 and 198 respectively include first arithmetic processing circuits 197a and 198a, speed processing circuits 197b and 198b, and servo processing circuits 197d and 198d.

A first control system 192" of the present embodiment includes a superposing circuit 199 between a speed processing circuit 192c of the Z1-axis direction and a servo processing circuit 192e of the Z1-axis direction. A feeding speed of the direction of the Z0 axis outputted from the speed processing circuit 197b of the third control system 197 is entered to the superposing circuit 199. A feeding speed of the Z1 axis outputted from the superposing circuit 199 is entered to a superposing circuit 196.

Accordingly, a feeding speed of the tool rest 160 in the direction of the Z1 axis is superposed on a feeding speed of the first spindle stock 120' in the direction of the Z0 axis, and the feeding speed of the tool rest 160 in the direction of the Z1 axis and a feeding speed of the second spindle stock 130 in the direction of the Z2 axis are superposed on the feeding speed of the spindle stock 120' in the direction of the Z0 axis.

Thus, superpositions of the three groups, i.e., the Z0 and Z1 axis, the Z1 and Z2 axis, and the X1 and X2 axis, are carried out, making it possible to carry out different machining operations for the works W1 and W2 by the three tools T1, T2 and T3.

The speed superposition has been described. However, the movements of the second spindle stock 130, the tool rest 160, the second tool rest 180 and the like are controlled based on positions, speeds and acceleration. Therefore, to superpose these movements, the positions and the acceleration are similarly superposed.

Process of Superposition

In the NC lathe of the present invention, superposition is carried out according to a predetermined process. Hereinafter, the process is described by referring to FIGS. 5 to 7, and FIGS. 13 to 15.

Figure 13:
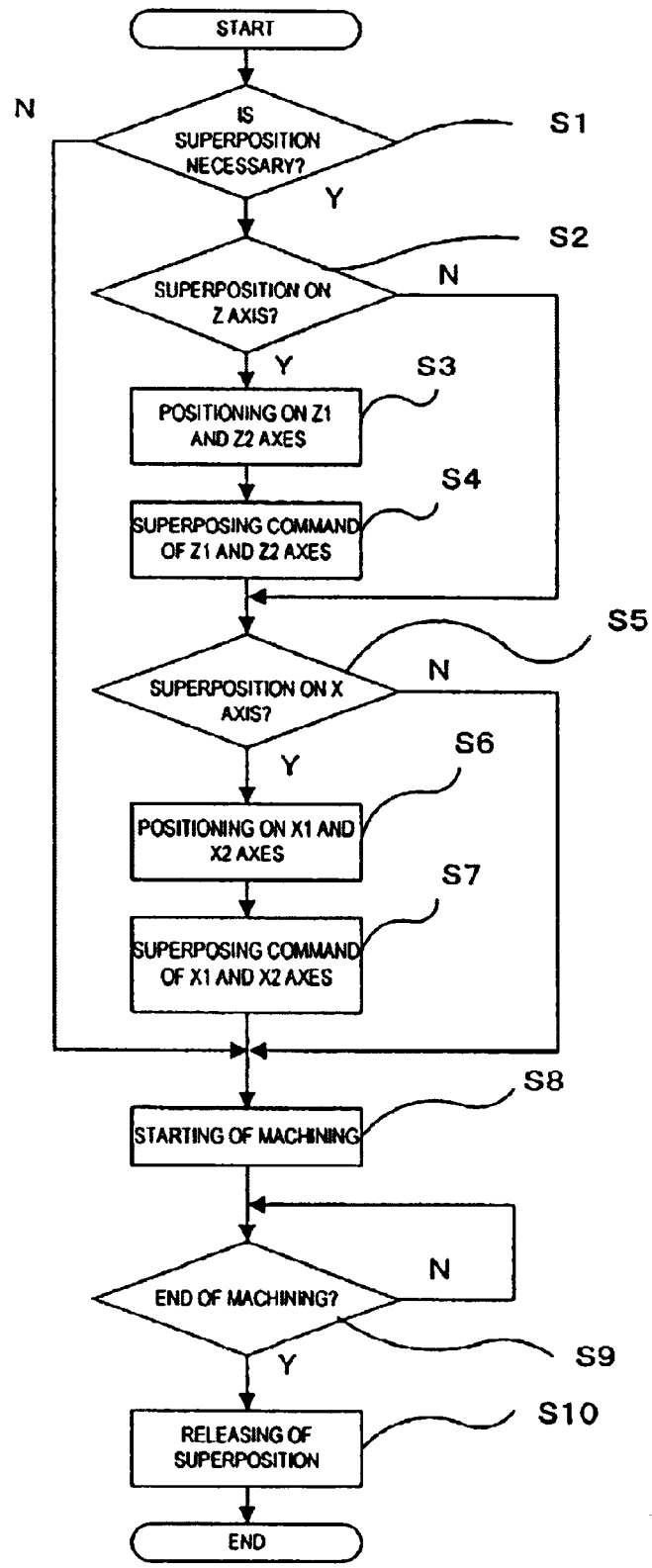
FIG. 13 is a flowchart illustrating a machining method according to the invention.

FIG. 13 is a flowchart illustrating a process of control for the machining method of the invention.

The CPU 191 determines whether superposition is necessary or not from NC machining programs for machining the works W1 and W2 (step S1). If superposition is not necessary, the works W1 and W2 are sequentially machined by the tools T1 and T2 respectively, according to the NC machining programs (step S8).

If superposition is necessary, determination is made as to whether an axis to be superposed is a Z axis or an X axis (steps S2 and S5).

If an axis to be superposed is the Z axis (Z1 and Z2 axis), the Z1 and Z2 axis are positioned (step S4), and the Z1 and Z2 axis are superposed (step S5).

If an axis to be superposed is the X axis (X1 and X2 axis), the X1 and X2 axis are positioned (step S6), and the X1 and X2 axis are superposed (step S7).

The axis to be superposed is positioned when one axis is superposed in order to enable a programmer making machining programs to understand a positional relation between the tool and the work more easily.

After the end of the superposition, according to the NC machining programs, the machining of the work W1 by the tool T1 and the machining of the work W2 by the tool T2 are simultaneously carried out (step S8).

After the end of the machining (step S9), the superposition is released (step S10), and the process is placed on standby for next machining.

Presence of the superposition has been checked in steps S1, S2 and S5 in the foregoing. However, this checking can be omitted.

Figure 14:
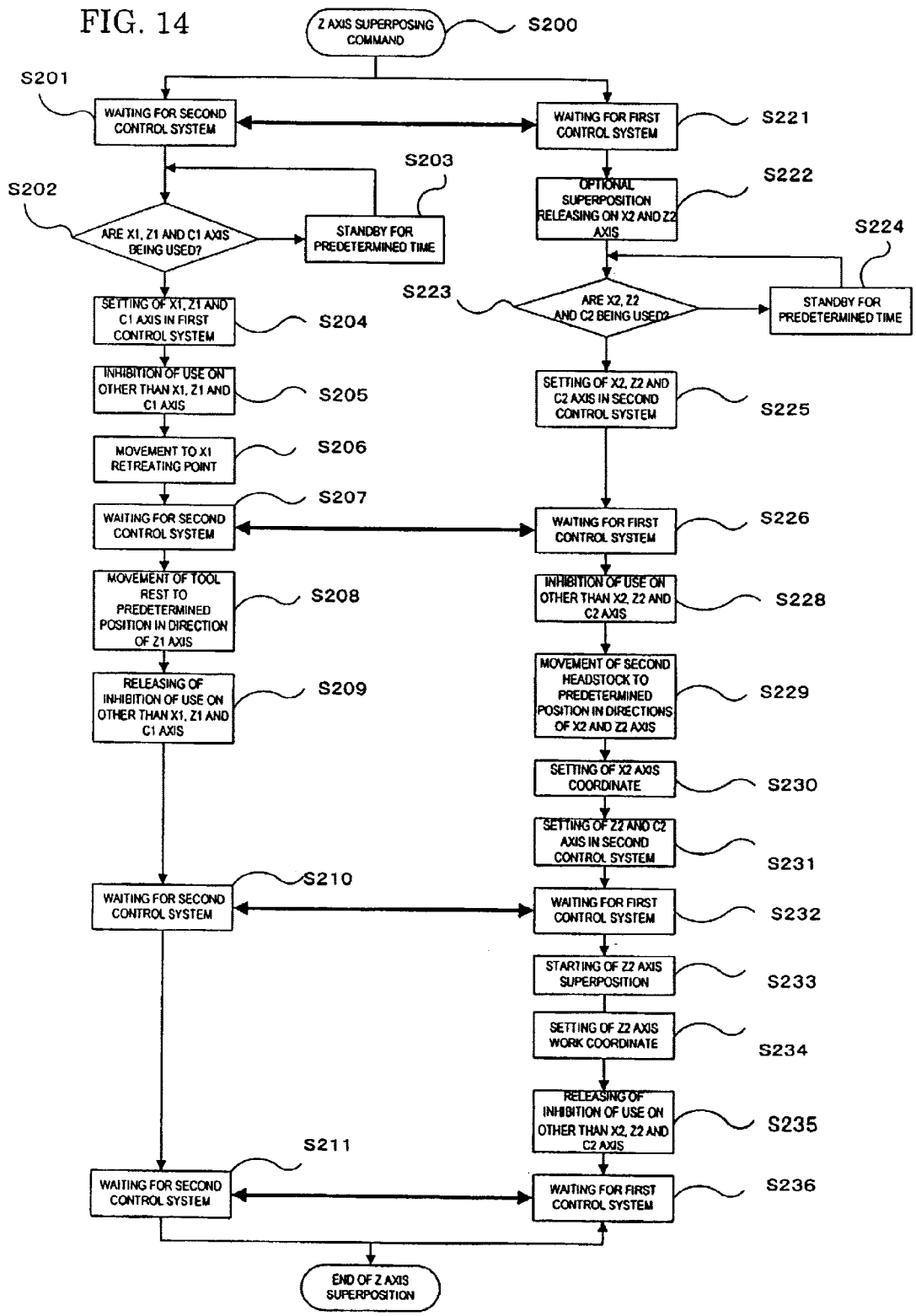
FIG. 14 is a flowchart illustrating a process of superposing Z1 and Z2 axis.
Figure 15:
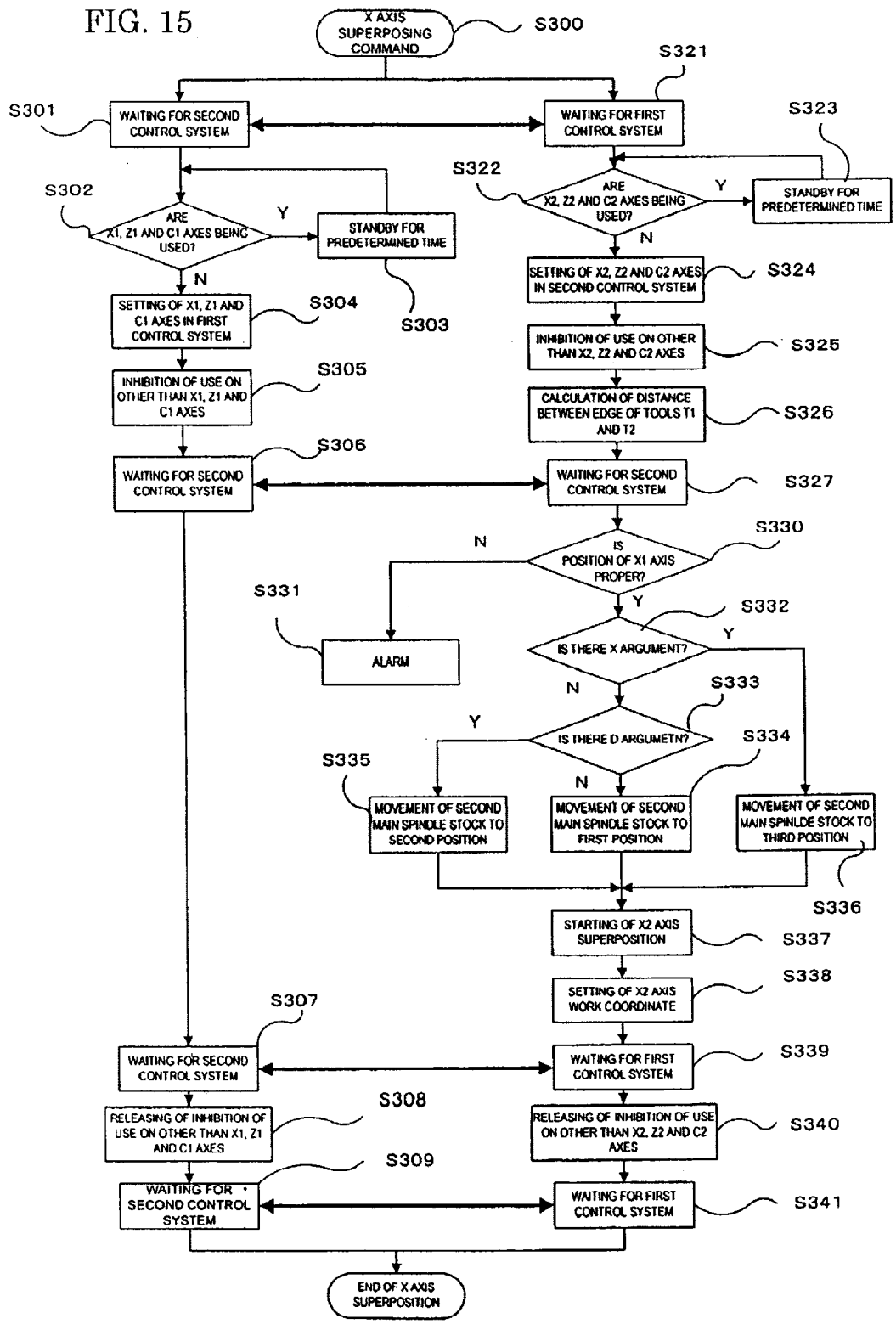
FIG. 15 is a flowchart illustrating a process of superposing X1a and X2 axis.
Figure 16A:
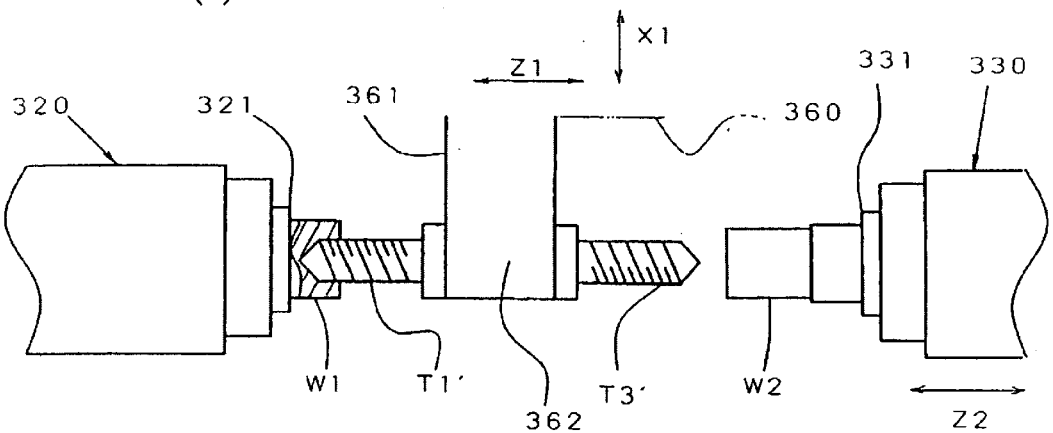
FIGS. 16(a) to 16(c) are explanatory views, each showing a work machining method described in Japanese Patent No. 2878690.
Figure 16B:
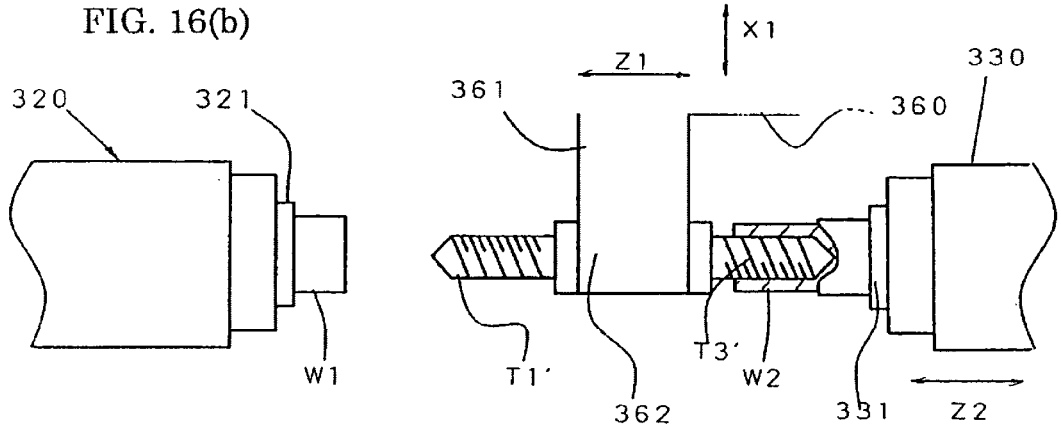
Figure 16C:
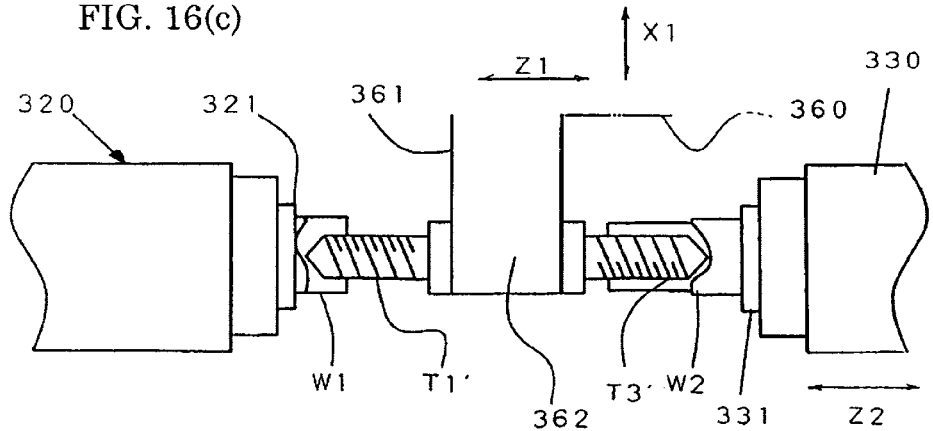
Figure 17:
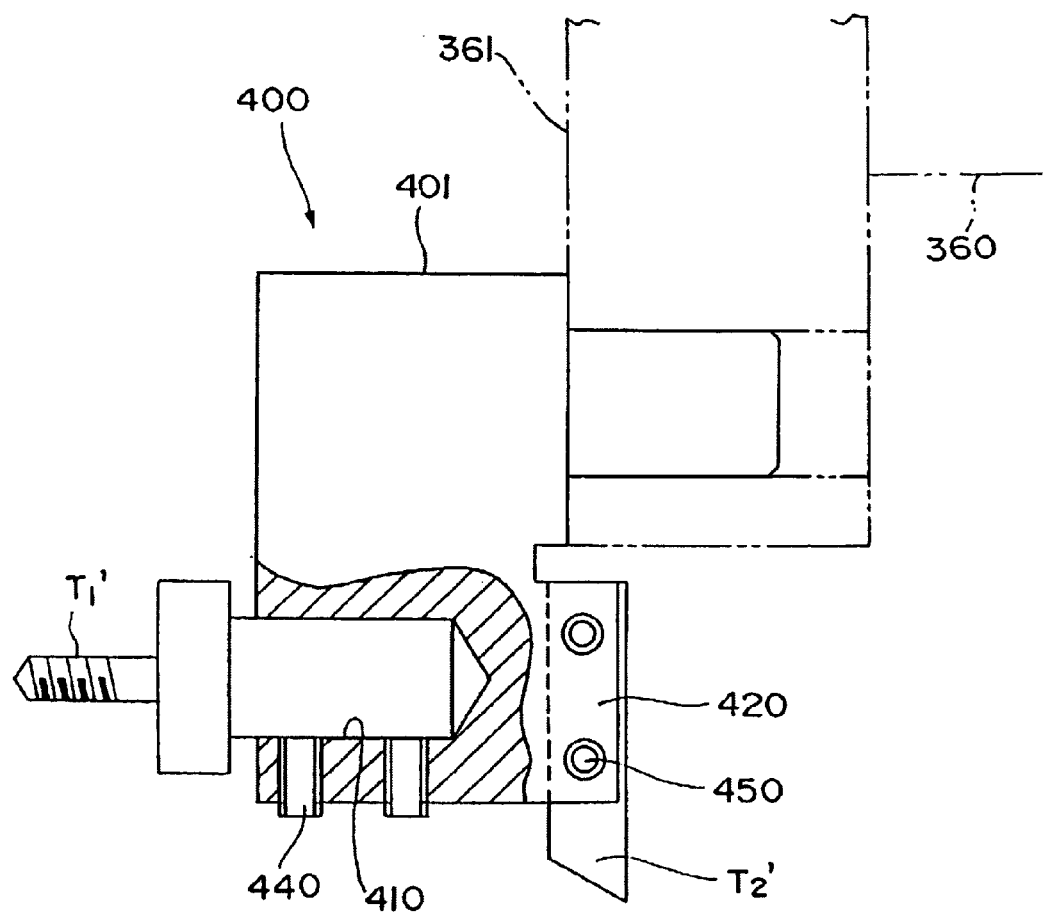
FIG. 17 is a partially broken side view of a tool holder according to conventional example, where two different tools can be attached to one holder body.
Figure 18A:
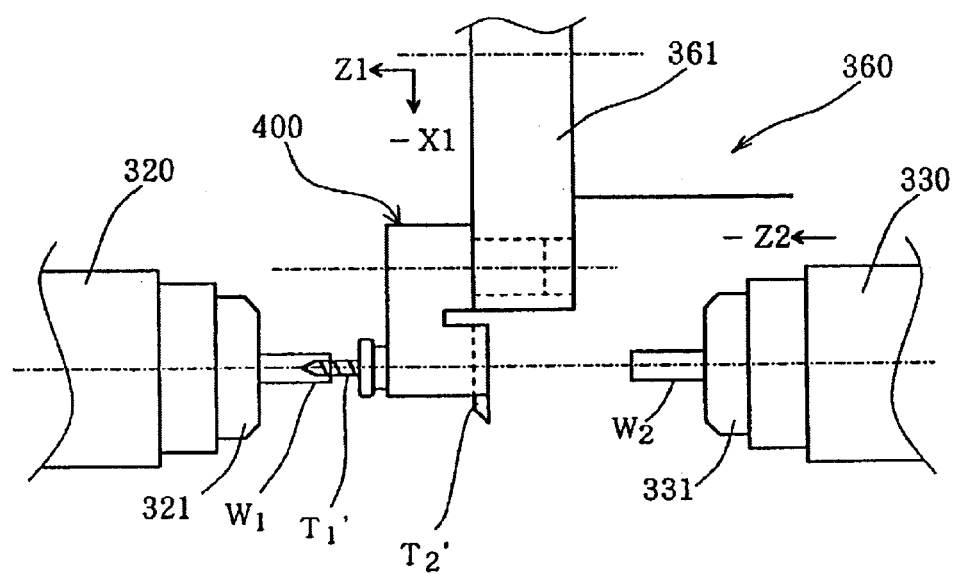
FIGS. 18(a) and 18(b) are explanatory views, each showing a machining method using a tool of the tool holder of FIG. 17.
Figure 18B:
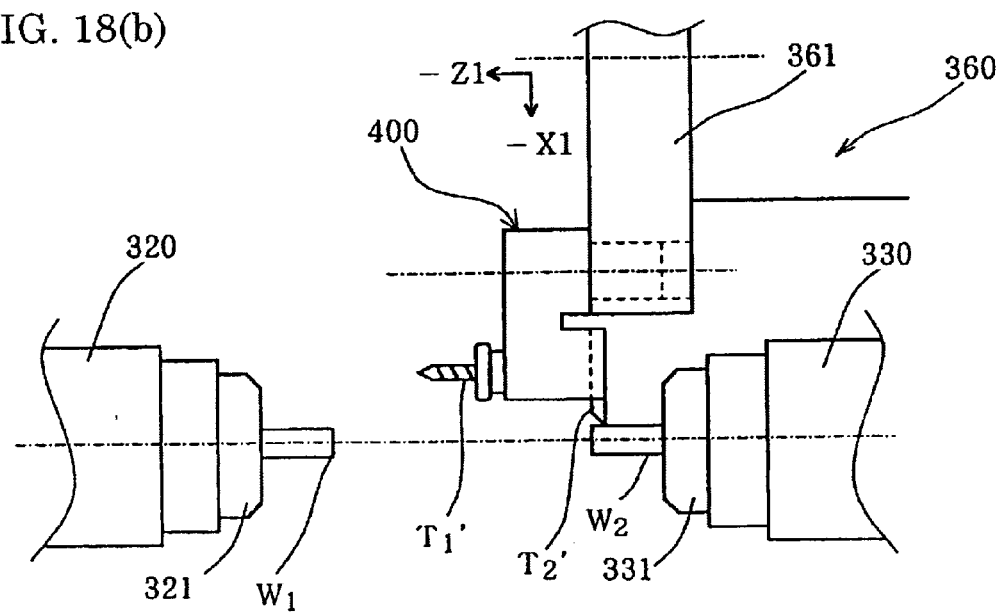
Figure 19:
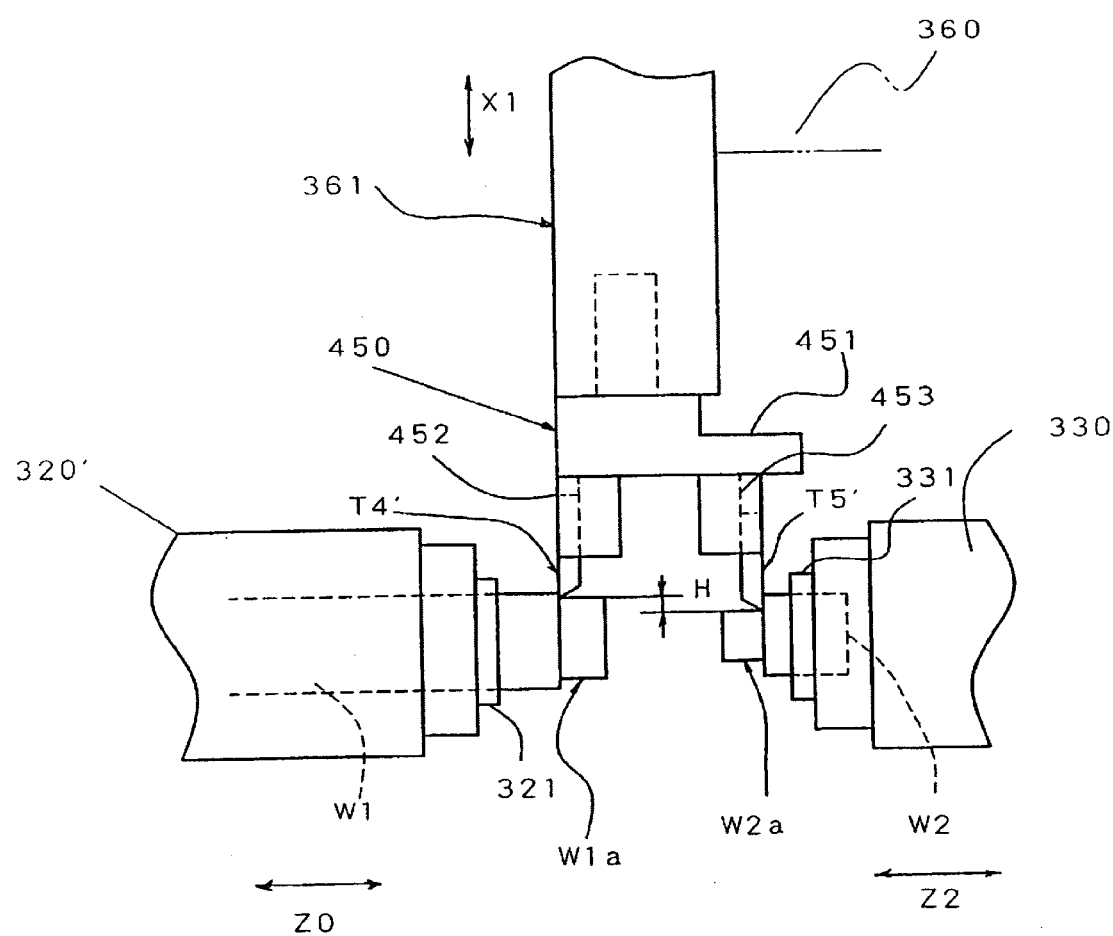
FIG. 19 is a views, showing another example of the tool holder shown in FIG. 17.

Next, a specific process for superposing the Z1 and Z2 axis, and the X1 and X2 axis will be described with reference to flowcharts of FIGS. 14 and 15.

Hereinafter, it is assumed that the two groups of the axis Z1 and Z2, and X1 and X2 are superposed and, after the end of the superposition of the axis Z1 and Z2, the X1 and X2 axis are superposed.

Superposition of Z Axis

When a command of Z axis superposition is present in the NC machining programs (step S200), the process waits for a program execution start timing of the Z1 and Z2 axis (steps S201, and S221).

In the first control system (system on the left side of the flowchart of FIG. 14), determination is made as to whether the X1, Z1 and C1 (rotational axis around the Z1 axis) axis are being used or not (step S202). If one or all of the X1, Z1 and X1 axis are being used, the process is placed on standby by interrupting preparatory work for a predetermined time (step S203), and waits until the use of the X1, Z1 and C1 is stopped.

If none of the X1, Z1 and C1 axis are being used, new axis X1, Z1 and C1 are set for machining in the first control system (step S204).

Then, use of the X1, Z1 and C1 axis in the other control system is inhibited (step S205), the tool rest 160 is moved to a retreating position designated on the X1 axis (step S206), and the process waits for the second control system (step S207).

In the second control system (system on the right side of the flowchart of FIG. 14), the process waits for execution start timing of the NC machining program (step S221), and then releases the commanded superposition of the X2 and Z2 axis (step S222). Then, determination is made as to whether the axis X2, Z2 and C2 (rotational axis around the Z2 axis) are being used or not (step S223). If one or all of the X2, Z2 and C2 axis are being used, the process is placed on standby for a predetermined time by interruption (step S224), and waits until the use of the X2, Z2 and C2 is stopped.

If none of the X2, Z2 and C2 are being used, new axis X2, Z2 and C2 are set in the second control system (step S225).

After the end of the above-described processing, the process waits for the first control system (step S226).

After the end of the waiting (steps S207 and S226), the first control system moves the tool rest 160 in the directions of the X1 and Z1 axis until a distance between the tool T1 and the work W1 reaches a predetermined distance (positional relation) (step S208).

Subsequently, the use inhibition of the X1, Z1 and C1 axis on the other control system is released (step S209), and the process waits for the second control system (step S210).

In the second control system, after the end of the waiting (steps S207 and S226), use of the X2, Z2 and C2 axis on the other control system is inhibited (step S228). Then, the second spindle stock 130 is moved in the directions of the Z2 and X2 axis, and a distance between the tool T2 and the work W2 is set to a predetermined distance (positional relation) (step S229). Then, a coordinate system of the work W2 is set on the X2 axis of this position (step S230), and new axis Z2 and C2 are set in the second control system (step S231). Thus, a command to the X2 axis is invalidated, and a position of the work 2 in the direction of the X2 axis is fixed.

Then, the process waits for the first control system (step S232).

After the end of the waiting (steps S210 and S232), superposition of the Z2 axis is started (step S233), and a coordinate system of the work W2 on the Z2 axis is set (step S234). The use inhibition of the X2, Z2 and C2 axis on the other control system is released (step S235), and the process waits for the first control system (S236).

After the end of the waiting (steps S211 and S236), the superposition of the Z1 and Z2 axis are completed.

Superposition of X Axis

When a command of X axis superposition is present (step S300), program execution timing are matched between the first and second control systems (steps S301, and S321).

In the first control system, determination is made as to whether the X1, Z1 and C1 axis are being used or not (step S302). If they are being used, the process is placed on standby for a predetermined time (step S303), and waits until the use of the X1, Z1 and C1 is stopped.

If none of the X1, Z1 and C1 axis are being used, new axis X1, Z1 and C1 are set in the first control system (step S304). Then, use of the X1, Z1 and C1 axis in the other control system is inhibited (step S305), and the process waits for the second control system (step S306).

In the second control system, after matching of program executing start timings (step S321), determination is made as to whether the axis X2, Z2 and C2 are being used or not (step S322). If they are being used, the process is placed on standby for a predetermined time (step S323), and waits until the use of the X2, Z2 and C2 is stopped.

If none of the X2, Z2 and C2 are being used, new axis X2, Z2 and C2 are set in the second control system (step S324), and use of these axis in the other system is inhibited (step S325).

Then, in the second control system, coordinate positions of the edges of the tools T1 and T2 are stored in the memory, and a distance H1 of the X2-axis direction between the coordinate positions is stored in the memory (step S326). After the end of the above-described processing, the process waits for the first control system (step S327).

After the end of the waiting (steps S306 and S327), a coordinate of a machining origin O1 of the work W1 is obtained (step S329) and, based this coordinate position, determination is made as to whether a position of the second spindle stock 130 is proper or not for superposition (step S330).

As a criterion of determination as to the proper position for superposition, for example, determination can be made based on whether the edge of the tool T2 is farther from the tool rest 160 in the direction of the X1 axis than the machining origin O1 of the first work W1 or not (in the example of FIG. 6, whether it is lower than the axis of the first spindle 121 passed through the machining origin O1 or not).

Specifically, when the edge of the tool T2 is above the axis of the first spindle 121, it is determined that the position is improper for superposition, understanding that it is outside the movable range of the X2 axis of the second spindle stock 130.

Thus, in such a case, an alarm state is set (step S331).

If superposition is allowed, then an initial position of the second spindle stock 130 is decided. In the described embodiment, as initial positions of the second spindle stock 130, three positions are prepared i.e., a first position where a machining origin O2 (on the axis of the second spindle 131) of the work W2 is in a position farther from the tool rest 160 by a distance H1 in the direction of the X2 axis than the machining origin O1 of the work W1 on the first spindle stock 120 side, a second position decided beforehand irrespective of machining shapes of the works W1 and W2, and a third position to be optionally set by a worker.

Selection of one of the first, second and third positions can be made by, for example an argument added to the NC program. By determining presence of an X argument of the NC program (step S332), the third position can be selected. By determining presence of a D argument (S333), the first position (step S334) or the second position (step S335) can be selected.

After the selection of a proper position from the first to third positions, superposition of the X2 axis is started (step S337), and a work axis of the X2 axis is set (step S338).

After the end of the above-described processing, the process waits for the first control system (step S339).

After the end of the waiting, use inhibition of each axis in the other control system is released (steps S308 and 340), and both are waited for (steps S309 and S341), and the superposition of the X1 and X2 axis are completed.

Each of the above-described superpositions of the Z and X axis may be executed before the other, but they can be carried out simultaneously.

Preferably, the process of superposing the Z axis, and the process of superposing the X axis may be formed into macroprograms. The formation into the macroprograms enables the machining program to be simplified, and the superposing work to be facilitated.

The preferred embodiments of the present invention have been described, but the invention is not limited to the embodiments.

For example, in the foregoing, the tooth shapes of the engaging portions 211 and 221 formed in the toothed portion 208 of the holder body 201 and the holders 210 and 220 are triangular. However, other shapes such as a circular-arc shape, a rectangular shape and a polygonal shape may be selected as long as the holders 210 and 220 can be positioned by engagement.

In the foregoing, the toothed portions 208 and 209 are provided on the two surfaces 202 and 203 of the holder body 201. However, the toothed portions may be formed on three or more surfaces of the holder body 201, and the holder may be attached to each surface.

In the foregoing, the relative rotation of the work with respect to the rotary tool such as a drill or the like attached to each of the tool rests 160 and 180 are carried out by rotating the first or second spindle 121 or 131. However, by providing rotary-driving mechanisms for rotating the tools in the tool rests 160 and 180, rotary tools such as drills or end mills attached to the tool rests 160 and 180 can be rotated. Thus, by attaching the rotary tools such as drills or end mills to the tool rests 160 and 180, machining such as drilling or key groove cutting can be carried out on the outer peripheral surfaces of the works W1 and W2. Therefore, it is possible to further enhance versatility b the NC lathe and the machining method of the invention.

Moreover, in the foregoing machine tool, the tool rest 160 is movable in the directions of the X1 and Z1 axis. However, the tools only need to be moved relative to the work, and a machine tool which fixes a tool rest to a predetermined position, and moves a spindle stock may be employed.

According to the present invention, not only similar but also different types of tools can be attached to one tool holder, and the tools attached to the tool holder can be easily adjusted in a positional relation suitable for machining a work.

Thus, the invention provides various advantages. A first advantage is that by using the tool holder, the work can be efficiently machined by a compact and low-price machine tool.

Second, the tool holder of the invention is applied especially to the machine tool capable of simultaneously executing different machining operations of the works of the first and second spindle sides by superposing a plurality of machining axis. Thus, machining efficiency can be further increased.

Third, since the holder having the tool attached to the holder body attached to the tool rest is easily removed, by grinding the edge of the tool while the tool is attached to the holder, accuracy of the edge position with respect to the holder or the holder body can be secured.

Other advantages are that even in the production system and the production facilities including the machine tool, setting-up time including changing of tools for work machining can be shortened, the types of machining tools including the tool holder can be reduced, storage space thereby needed can be reduced, running costs including management costs can be reduced by efficient storage, and the like.

Possibility of Industrial Utilization

The tool holder of the present invention is not limited to the NC lathe including the two spindle stocks and at least one tool rest, but can be applied to an NC lathe including two or more tool rests. Also, other than the lathe, the tool holder can be applied to all types of machine tools for machining works by tools attached to tool rests. Further, the tools are not limited to the turning tool for cutting and the drill for drilling, but other tools such as an end mill, and a tap can be used.

What is claimed is:

1. A tool holder, for attaching a tool, attached to a tool rest of a machine tool having the tool rest provided with the tool for machining a work, comprising:
   a holder body attached to the tool rest,
   a plurality of tool attaching surfaces formed around the holder body,
   a holder which is attached to a tool attaching surface and to which the tool for machining the work is attached,
   a toothed portion of a tooth-shaped row formed in a predetermined direction on the tool attaching surface,
   an engaging portion formed on a holder surface attached to the tool attaching surface and engaged with the toothed portion to position the holder in a predetermined position of the tool attaching surface, and
   attaching means for attaching the holder to the holder body in an engaging state where the toothed portion is engaged with the engaging portion.

2. The tool holder according to claim 1, wherein the attaching means comprises an engaging groove formed in the tool attaching surface, an engaging member slidably provided in the holder and having one end engaged with the engaging groove and the other end connected to the holder, and urging means for pressing the holder to the tool attaching surface by urging the engaging member in a direction in which the engaging member is drawn to the holder side.

3. The tool holder according to claim 2, further comprising position adjusting means which have a screw hole formed in the engaging member, and which is provided with an axis in the same direction as a tooth direction of the toothed portion, a screw inserted into the screw hole, and which rotate in the screw hole to be abutted on an inner wall of the engaging groove, and a tool inserting portion formed in the holder to insert a tool for rotating the screen in the screw hole thereinto, and which make the screw rotate by the tool inserted into the engaging groove from the tool inserting portion to abut the screw on the inner wall of the engaging groove, and thereby adjusting an attaching position of the holder in the same direction as the tooth direction of the toothed portion.

4. The tool holder according to claim 2, wherein the urging member is a cam provided in a connecting portion between the holder and the engaging member.

5. The tool holder according to claim 1, wherein the engaging portions are formed on a plurality of surfaces of the holder.

6. The tool holder according to claim 5, wherein the engaging member is rotatably provided around the connecting portion between the holder and the engaging member, and the connecting portion is provided in a position equidistant from the engaging portions provided on the plurality of surfaces.

7. A work machining method using a tool holder which comprises fixing a work at a predetermined position, attaching a tool for machining the work to a tool rest, and then carrying out the machining of the work by the tool based on relative movements or rotations of the work and the tool rest, said method comprising:
   a step of preparing a tool holder including a holder body attached to the tool rest, a plurality of tool attaching surfaces formed around the holder body, a holder which is attached to a tool attaching surface and to which the tool for machining the work is attached, a toothed portion of a tooth-shaped row formed in a predetermined direction on the tool attaching surface, an engaging portion formed on the holder surface attached to the tool attaching surface and engaged with the toothed portion to position the holder in a predetermined position of the tool attaching surface, and attaching means for attaching the holder to the holder body in an engaging state where the toothed portion is engaged with the engaging portion;
   a step of attaching a plurality of tools to the tool holder to attach them to the tool rest; and
   a step of machining a plurality of works by the plurality of tools attached to the tool holder.

8. A work machining method comprising the steps of:
   preparing a machine tool including first and second spindle stocks arranged oppositely to each other, first and second spindles supported on the first and second spindle stocks, respectively, and at least one tool rest for attaching tools which machine works gripped by the first and second spindles;
   attaching first and second tools directed respectively to the first and second spindle stock sides to the tool holder;
   moving the tool rest in a direction of a Z1 axis parallel to an axis of the first spindle and a direction of an X1 axis orthogonal thereto;
   setting the second spindle stock movable in a direction of an X2 axis parallel to the X1 axis of the tool rest and a direction of a Z2 axis parallel to the Z1 axis;
   superposing a movement of the second spindle stock in the direction of the X2 axis necessary for machining the work by the second tool on a movement in the direction of the X1 axis, superposing a movement of the second spindle stock in the direction of the Z2 axis necessary for machining the work by the second tool on a movement of the direction of the Z1 axis, and moving the second spindle stock in the directions of the X2 and Z2 axis; and
   simultaneously carrying out machining operations of the works of the first and second spindles by the first and second tools.

9. The work machining method using the tool holder according to claim 8, wherein the first and second tools are attached to the tool holder in a manner that a predetermined positional relation is set between edge positions of the first and second tools, and an initial position of the second spindle stock at a start of machining is decided in a manner that a positional relation between machining origins of the works gripped by the first and second spindles corresponds to the positional relation between the first and second tools.

10. The work machining method using the tool holder according to claim 8, wherein a distance between the edges of the first and second tools in the direction of the Z1 or X1 axis is set larger than a maximum value of a moving distance of the tool rest in the direction of the Z1 or X1 axis during machining of the work by the first tool, and a distance between machining origins of the works of the first and second spindles in the direction of the Z2 or X2 axis corresponds to the distance between the edges of the first and second tools in the direction of the Z1 or X1 axis.

11. The work machining method using the tool holder according to claim 8, wherein in superposition of one selected from groups of the X1 and X2 axis and the Z1 and Z2 axis to be superposed, an axis position of the other group is positioned in a preset position and, in superposition of the other group, an axis of the one group finished for superposition is positioned in an optional position.

* * * * *